(12) United States Patent
Filippo et al.

(10) Patent No.: US 11,808,712 B2
(45) Date of Patent: Nov. 7, 2023

(54) COATING DETERMINATION

(71) Applicant: TAU ACT GMBH, Berlin (DE)

(72) Inventors: Veglia Filippo, Turin (IT); Taiariol Francesco, Turin (IT); Degasperi Piero, Trento (IT); Ciornii Vitalie, Pavarolo (IT)

(73) Assignee: TAU ACT GMBH, Berlin (DE)

( * ) Notice: Subject to any disclaimer, the term of this patent is extended or adjusted under 35 U.S.C. 154(b) by 346 days.

(21) Appl. No.: 16/495,169

(22) PCT Filed: Mar. 21, 2018

(86) PCT No.: PCT/GB2018/050724
§ 371 (c)(1),
(2) Date: Sep. 18, 2019

(87) PCT Pub. No.: WO2018/172763
PCT Pub. Date: Sep. 27, 2018

(65) Prior Publication Data
US 2021/0109028 A1    Apr. 15, 2021

(30) Foreign Application Priority Data

Mar. 21, 2017 (GB) .................................. 1704447
May 25, 2017 (GB) .................................. 1708392

(51) Int. Cl.
*G01N 21/84* (2006.01)
*G01N 21/359* (2014.01)

(52) U.S. Cl.
CPC ....... *G01N 21/8422* (2013.01); *G01N 21/359* (2013.01); *G01N 2021/8427* (2013.01); *G01N 2201/129* (2013.01)

(58) Field of Classification Search
None
See application file for complete search history.

(56) References Cited

U.S. PATENT DOCUMENTS

| | | | |
|---|---|---|---|
| 3,903,843 A | | 9/1975 | Jones |
| 4,468,117 A | * | 8/1984 | Hartouni ............. G01M 11/088 |
| | | | 356/73.1 |

(Continued)

FOREIGN PATENT DOCUMENTS

| | | |
|---|---|---|
| CA | 2 504 779 A1 | 10/2006 |
| CN | 101299022 A | 11/2008 |

(Continued)

OTHER PUBLICATIONS

International Search Report, issued in PCT/GB2018/050724, dated Oct. 10, 2018.

(Continued)

*Primary Examiner* — Edwin C Gunberg
(74) *Attorney, Agent, or Firm* — Birch, Stewart, Kolasch & Birch, LLP

(57) ABSTRACT

A method performed in a coating testing system for automatically determining the polymerisation of coating material includes positioning a spectrometer probe adjacent to an object (wire 10), the object comprising a polymer coating; acquiring spectra of the polymer coating using the probe; and performing chemometric analysis on the acquired spectra in order to measure the polymerisation of the polymer coating.

12 Claims, 20 Drawing Sheets

(56) References Cited

U.S. PATENT DOCUMENTS

| | | | |
|---|---|---|---|
| 4,802,763 A | 2/1989 | Gerlinger et al. | |
| 5,091,647 A | 2/1992 | Carduner et al. | |
| 5,302,411 A * | 4/1994 | Toth | B05D 3/0272 |
| | | | 427/8 |
| 8,319,182 B1 | 11/2012 | Brady et al. | |
| 2002/0112967 A1 | 8/2002 | Price | |
| 2002/0122888 A1 * | 9/2002 | Ramesh | C09D 161/20 |
| | | | 525/100 |
| 2003/0074095 A1 | 4/2003 | Neubauer et al. | |
| 2003/0156283 A1 | 8/2003 | Jung et al. | |
| 2003/0199648 A1 * | 10/2003 | McDaniel | C08F 4/025 |
| | | | 526/111 |
| 2010/0032572 A1 | 2/2010 | Shelley et al. | |
| 2011/0108731 A1 | 5/2011 | Shelley et al. | |
| 2012/0213246 A1 | 8/2012 | Honbo et al. | |
| 2016/0231230 A1 | 8/2016 | Bonacini et al. | |
| 2017/0191947 A1 | 7/2017 | Gilliam | |

FOREIGN PATENT DOCUMENTS

| | | | | |
|---|---|---|---|---|
| CN | 101750024 A | 6/2010 | | |
| CN | 104089923 A | 10/2014 | | |
| CN | 104089941 A | 10/2014 | | |
| CN | 104807496 A | 7/2015 | | |
| CN | 105659072 A | 6/2016 | | |
| EP | 2 138 830 A2 | 12/2009 | | |
| JP | 2-86012 U | 7/1990 | | |
| JP | 8-80444 A | 3/1994 | | |
| JP | 6-273326 A | 9/1994 | | |
| JP | 8-5586 A | 1/1996 | | |
| JP | 9-97523 A | 4/1997 | | |
| JP | 10-302547 A | 11/1998 | | |
| JP | 2000-159897 A | 6/2000 | | |
| JP | 2016-183914 A | 10/2016 | | |
| WO | WO-8401430 A1 * | 4/1984 | | G01N 21/314 |
| WO | WO 2009/080049 A1 | 7/2009 | | |
| WO | WO 2016/014066 A1 | 1/2016 | | |

OTHER PUBLICATIONS

Written Opinion of the International Searching Authority, issued in PCT/GB2018/050724, dated Oct. 10, 2018.
European Communication pursuant to Article 94(3) EPC for corresponding European Application No. 18715068.5, dated Dec. 14, 2021.
Japanese Office Action for corresponding Japanese Application No. 2019-551944, dated Dec. 14. 2021, with English translation.
Japanese Office Action for Japanese Application No. 2019-551944, dated Sep. 6, 2022, with an English translation.
Japanese Office Action for Japanese Application No. 2019-551944, dated Apr. 4, 2023, with an English translation.

\* cited by examiner

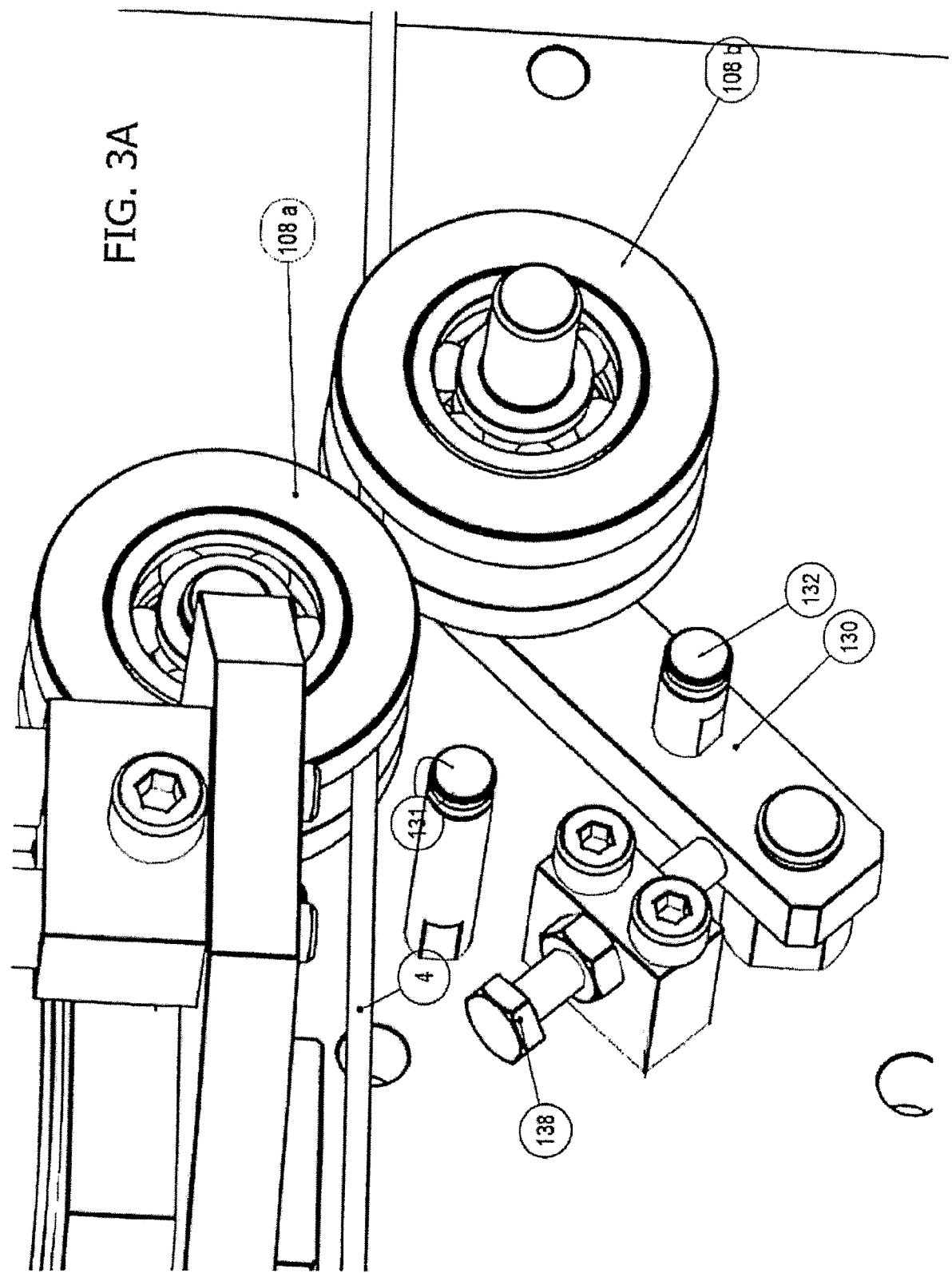

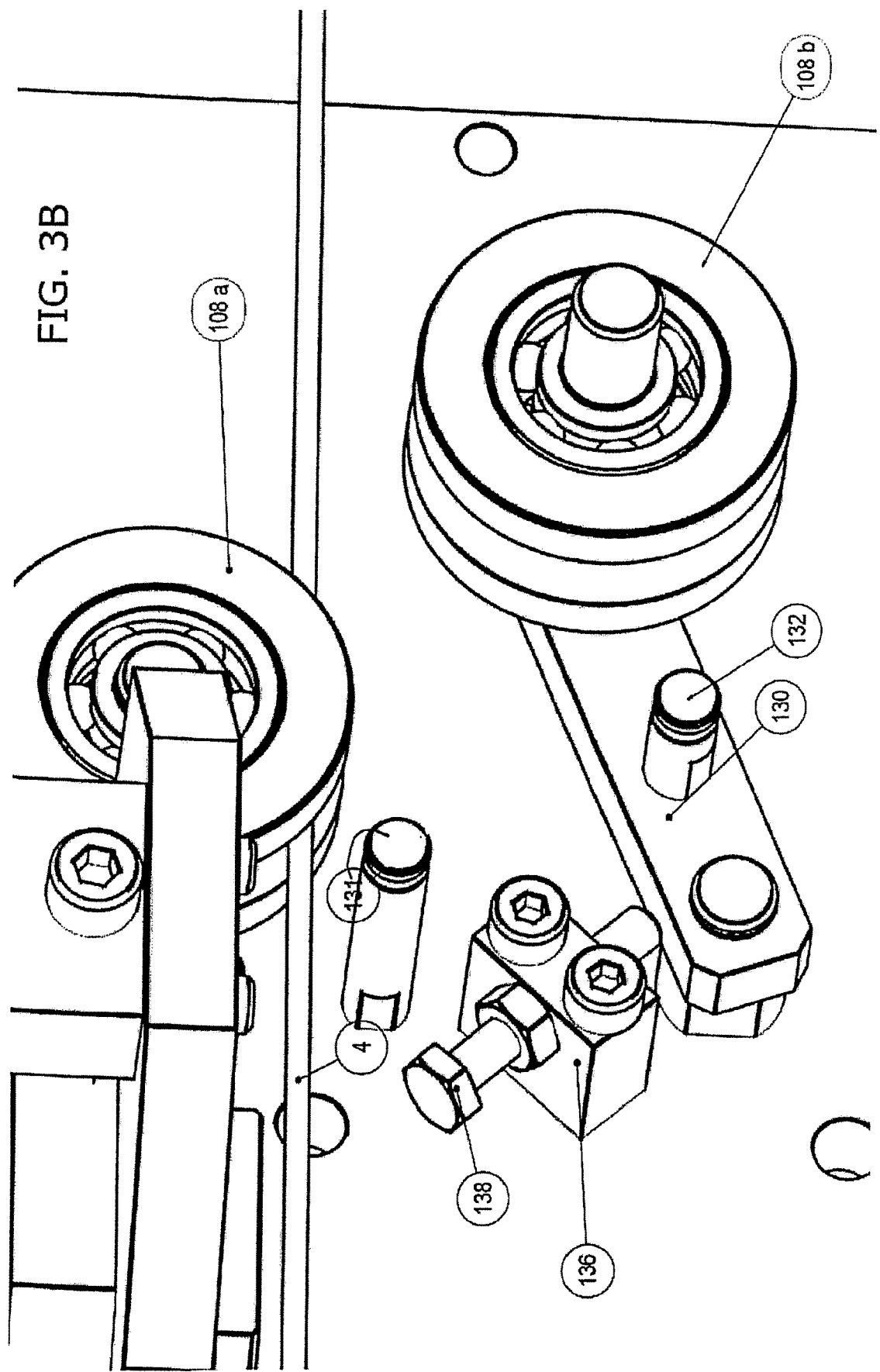

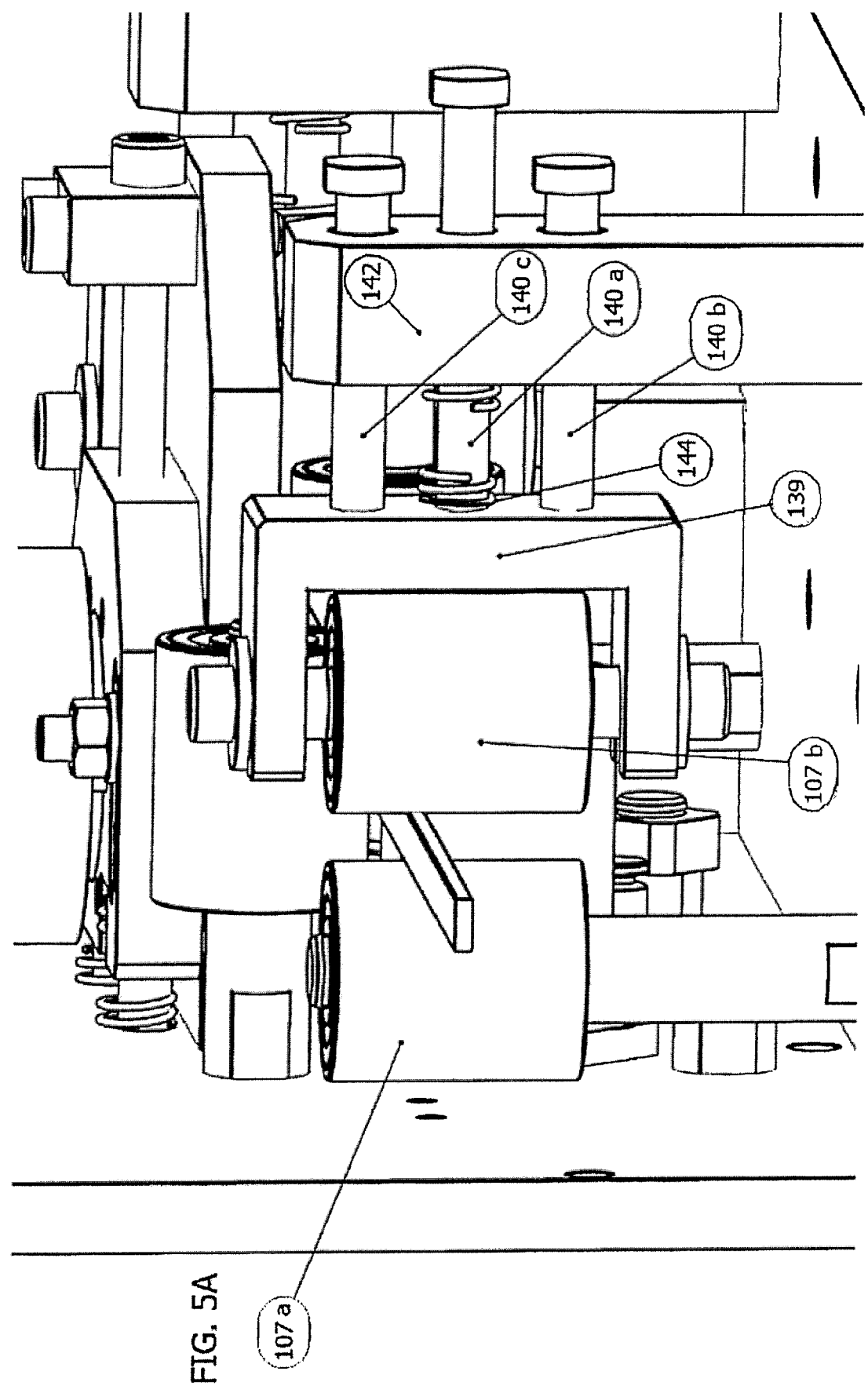

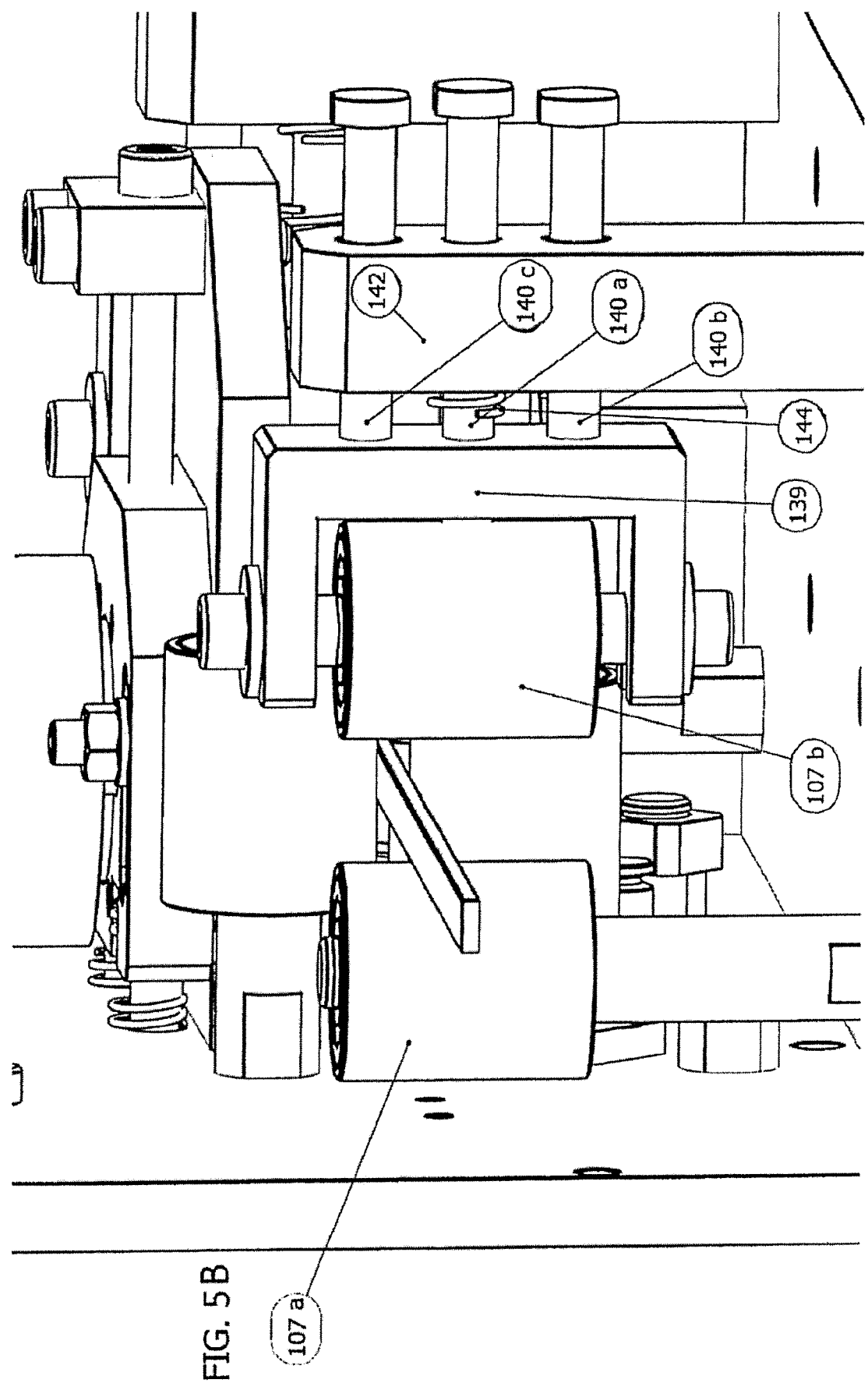

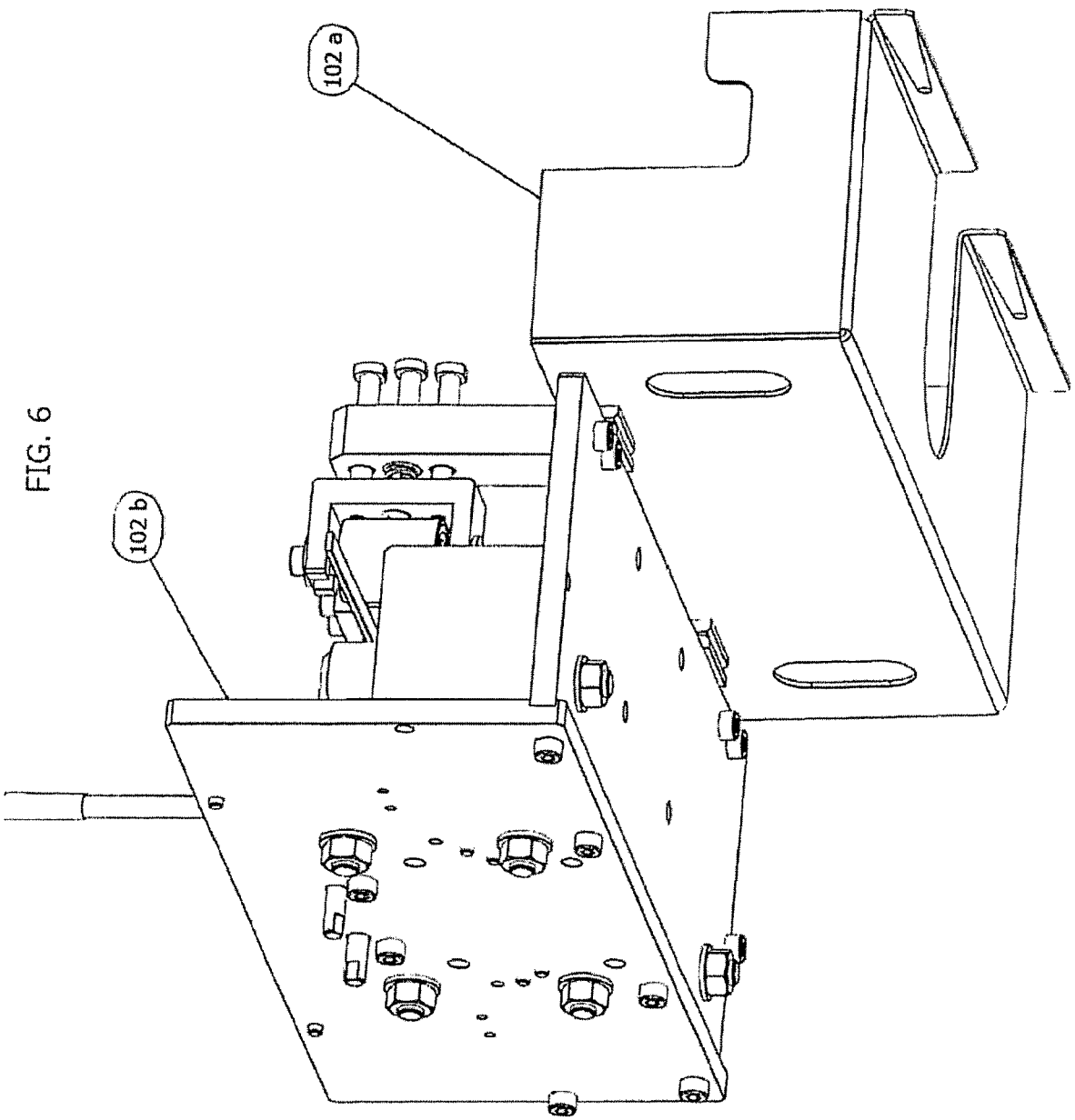

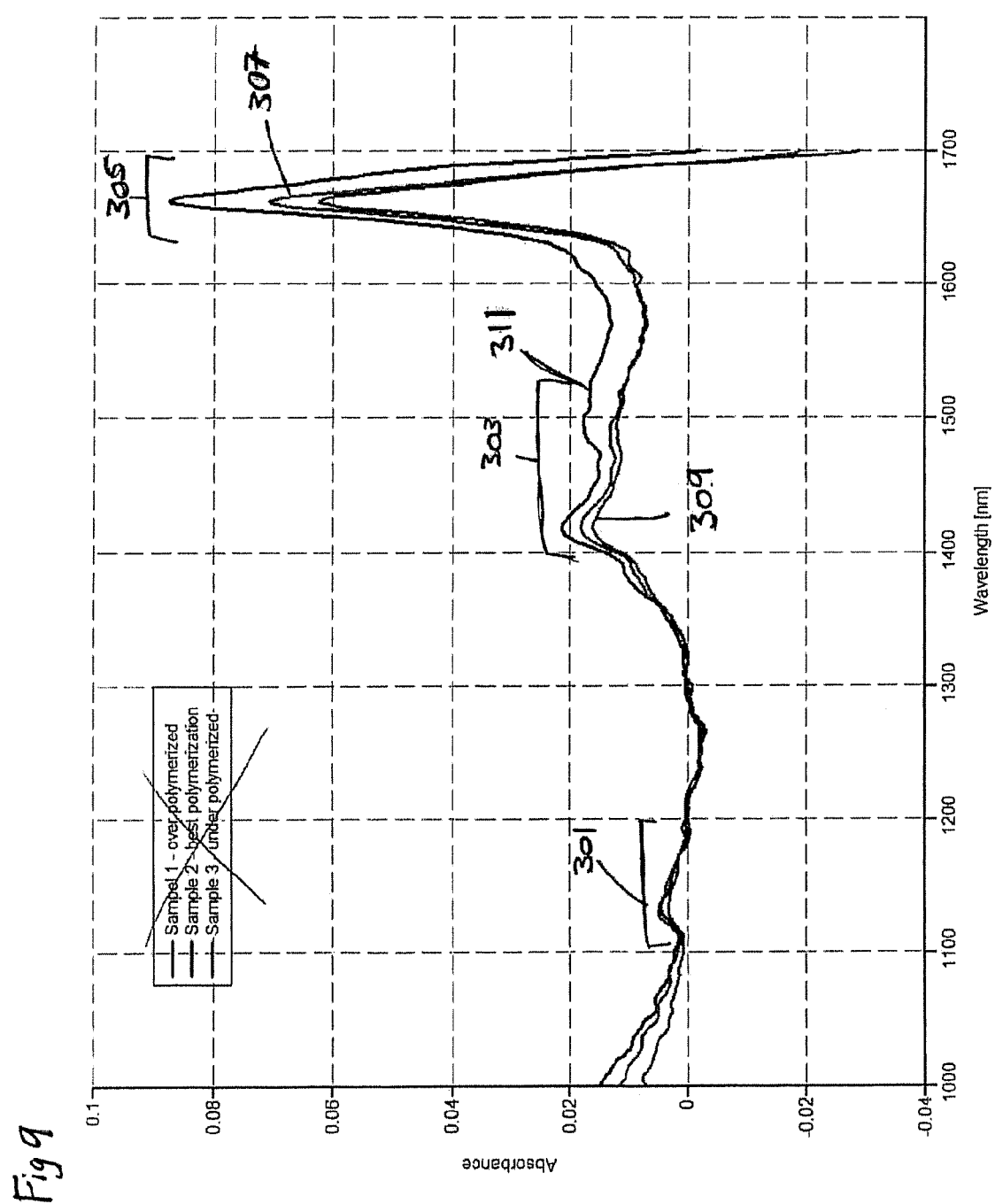

COATING DETERMINATION

FIELD

The present invention relates generally to using spectroscopic techniques to determine the properties of coating materials. Embodiments include, using spectroscopic techniques to determine the properties of a coating materials.

BACKGROUND

Important quality factors of coated wires are the insulation properties of both the wire enamel and of the secondary insulation varnish. The curing level of the insulating polymers that make up the insulation material is critical to ensure that a high quality is achieved.

Known methods used to assess the quality and reliability of electrical insulation involves destructive tests and these are expensive and time consuming. For magnet wires, the Loss Angle Tangent Test (also known as Tan Delta (tg δ) test) is commonly used. This requires a small sample of wire to be heated gradually, whilst measuring the dispersion current through the insulating layer. This is an off-line, sample destructive test that takes between 10 to 40 minutes per sample. Other testing equipment are capable of performing parallel tests on 8 samples at a time, but this takes approximately 1 h 30 min. An alternative test often used to check the insulation of wires for motors and transformers involves taking the final piece of coated wire and mounting it on a test bench. An increasing voltage is then applied to the wire until the coating becomes burnt. As with the Tangent Test, this is also off-line and sample destructive and can take up to several hours to perform. Other known tests include mechanical stress, solvent retention, bonding strength, amongst others.

There is therefore a need to improve on known techniques for determining the quality of polymer coating materials.

SUMMARY OF INVENTION

According to a first aspect of the invention there is provided a method performed in a coating testing system for automatically determining one or more properties of coating material, the method comprising: positioning a spectrometer probe adjacent to an object, the object comprising a polymer coating; acquiring spectra of the polymer coating using the probe; performing chemometric analysis on the acquired spectra in order to measure one or more properties of the polymer coating.

Advantageously, the chemometric analysis correlates the acquired spectra to specific coating parameters. This enables a fast, efficient, and non-destructive method of determining the parameter and/or quality of the polymer coating.

The spectrometer probe, otherwise known as a spectroscopy probe, that is used may be a conventional spectroscopic probe. Preferably the probe is a reflection type probe. A reflection probe carries out transmission and detection of the signal which enables the signal to be acquired from the sample. Positioning of the probe adjacent to the object ensures that the signal detected is of sufficient quality, ensuring that the attenuation of the signal by external sources is kept to a minimum and increasing the signal to noise ratio.

In some embodiments the probe may include a light transmission and detection probe with an external light source, for instance a lamp. In this probe a number of fibres transmit the light from the lamp to the end of the probe, to be incident on the coating. There may be any number of transmission fibres. For instance, there may be a single fibre, or there may be 4, 5, or 6 fibres. A further fibre detects the reflected light from the coating sample, entering into the end of the probe, which is then transmitted to the spectrometer.

In other embodiments, the probe may be a light detection probe with an in-built lamp. The lamp is located at the end of the probe. There is also a detection fibre that carries the reflected light from the end of the probe to the spectrometer.

In other embodiments, rather than a probe there may be two inclined, single cored, fibres with one fibre attached to an external lamp which is used to transmit the light; and another fibre is positioned so as to capture the reflected light and bring it to the spectrometer.

Preferably, the method comprises coating the object with a polymer in a coating process. Advantageously, this provides an in-line determination of the coating parameters.

Preferably, the method further comprises feeding the object through the coating testing system that both performs said coating process and performs said measurement of the properties of the polymer coating.

Advantageously, feeding the object through the system enables a length of object to first be coated, and then the properties of the coating subsequently tested. This enables spectra to be acquired at regular intervals along the coated object or on successive objects. In some instances, these intervals may be set to be very small, such that the properties of the polymer coating appear to be measured almost continuously along the length of the object. Where only a single coating to the object is required, the object that is fed into the system is uncoated object. Alternatively, in other embodiments where multiple coatings are required, the object fed through the coating system may be either an uncoated object, or a coated object.

The spectrometer probe may be maintained at a fixed distance from the object, such that the spectrometer probe does not contact the object, and a fixed orientation relative to the object. In some embodiments, the probe may be held at a distance of 1 mm from the object. In other embodiments the probe may be held at 1 cm from the object. In other embodiments, the probe may be held at any distance between 1 mm to 1 cm from the object. The distance depends on the surface to be monitored. For instance, in some embodiments the object may be a wire. In this case for flat wire it depends on the wire's width, and for round wire it depends on the wire's diameter.

The distance is preferably chosen so that the area of detection does not exceed the surface of the object. This enables the best signal to noise ratio to be achieved. The probe must be positioned so that the light goes into the enamel (coating material) at a specific distance and angle from it.

Advantageously, this enables the probe to be accurately calibrated to ensure the spectra that are obtained are comparable to one another, which aids in accurate measurement of the properties of the polymer coating. The fixed distance and orientation may be varied when coating different object types. For instance, objects with different thicknesses, different profiles (e.g. round or flat), or different coating materials, may require the probe to be maintained at various distances or angles relative to the coated object. The distance and orientation may be adjusted prior to commencing the coating process. It is advantageous that the probe does not contact the object as this may affect the setting of the coating material and affect the results obtained. The probe may be held in a probe holder at the fixed distance and orientation, as will be discussed later.

Preferably, the method further comprises applying signal pre-processing to the acquired spectra in order to measure the properties of the polymer coating. This ensures that the spectra are in a form that can be used to accurately determine the properties of the polymer coating. The signal pre-processing may involve removing unwanted noise from the spectra. It may also involve cutting off part of the spectra, for instance reducing the spectral width. Reducing the width of the spectra enables a particular region of the spectra to be focused on, and reduces the size of the data that has been acquired, which will aid in more efficient processing and storage of the data. The signal pre-processing may include noise-minimising methods, including any combination of: smoothing, scaling, data selection, digital filter Savitsky-Golay, and numerical differentiation (using the first and second derivatives), baseline subtraction, detrending.

Preferably, the chemometric analysis comprises projecting the acquired spectra onto a correlation model. The correlation model may be created by acquiring spectra on a plurality of coating materials, with known properties, as is outlined in the second aspect of the invention.

It is preferable that the acquired spectra is pre-processed using the same pre-processing as for the spectra of the plurality of coating materials used to create the correlation model. This ensures that the datasets can be reliably compared to one another.

Preferably, the spectra is acquired using near infrared spectroscopy, NIR. Advantageously, this provides a molecular level analysis of the structure of the polymer coating material. Polymer coating materials are comprised of organic molecules comprising many functional groups, which provide unique fingerprints in NIR spectra. The technique is sensitive to the molecular structure of the organic molecules, providing a quantitative analysis.

Preferably the NIR spectra are acquired in the 700 nm to 2500 nm band. More preferably the NIR spectra are acquired in the 900 to 1750 nm band. However, in other embodiments any NIR band may be used.

Alternatively, in other embodiments different types of spectroscopy may be used. For instance any of infrared spectroscopy, Raman spectroscopy, Fourier transform spectroscopy (FTIR), mid infrared spectroscopy (MIR), Ultraviolet-visible (UV/VIS) spectroscopy, or nuclear magnetic resonance (NMR) spectroscopy may be used.

Preferably, the one or more properties include the polymerisation of the polymer coating. The polymerisation of the coating provides a reliable indication of the quality of the coating material. In some embodiments, the polymer coating may be applied to the object in a viscous form. The viscosity of the coating material may be low in some embodiments. After application, the coating material may set, resulting in the polymerisation, or cross linking, of the coating structure. The polymerisation in some embodiments may occur automatically after coating. In other embodiments, the polymerisation may be achieved by passing the object through an oven, or any other type of heat source.

Alternatively, other properties may be determined which may include the uniformity of the coating material, and/or the thickness of coating material. Alternatively, it may be determined if the type of coating material is correct, or that no foreign objects have ended up within the coating material.

In some embodiments, the polymer coating may be a thermosetting polymer. In other embodiments the polymer coating may be a thermoplastic polymer. For instance, the polymer coating may be any of Polyester-imide (PEI), Polyesterimide overcoated with Amide-IMIDE (PEI+AI), Polyvinyl fluoride (PVF), Polyurethane (PU), fiber glass, epoxy, Polyester Polyethersulfone (PES), THEIC PES, Polyamide-imides (PAI), PVF/PVA (polyvinyl formal/Poly (vinyl alcohol)), PEI+PAI, PE (Polyethylene)+PAI, or other combinations with additives. Advantageously, the coating material can be chosen according to the purpose of the object.

Preferably, the object is any of: a wire, an optical fibre, a coaxial fibre, or a surface coated with a polymer.

Preferably, the wire is magnet wire. For instance it may be for use in transformers, inductors, motors, speakers, hard disk head actuators, electromagnets, or other applications that require insulated wire. The wire may be copper, steel, aluminium, or an alloy.

Preferably the method further comprises, automatically generating data for substantially real time control of the coating process in dependence on the measured properties.

The method enables control of a coating process in real time. Immediately after the object is coated, spectroscopy can be used to determine the quality of the coating. This enables 'in-line' testing of the coating. This allows adjustments to be made to the coating parameters almost instantaneously during the coating process.

Preferably, the method further comprises automatically displaying on a visual display the automatically generated data for control of the coating process substantially in real time. For instance, after correlating a projection of the acquired spectra onto the correlation model. Advantageously, this provides an indication on the display regarding how the coating process should be controlled. This may include an indication that the parameters of the coating process should be adjusted. In other embodiments, it may provide details of the coating parameters of the object being tested inferred from the correlation model. In some embodiments, the display is presented to a user who can then adjust and control the coating process. Advantageously, this provides real-time control, with the indication displayed to the user near instantaneously after the spectra of the coating has been acquired.

Preferably, the method further comprises using the automatically generated data for control of the coating process in a feedback loop so that the coating process is automatically adjusted. The feedback loop enables parameters of the coating process to be adjusted, automatically controlling the coating process based on the measured properties of the polymer coating. Advantageously, this provides a fully automated system, not requiring any user input to adjust the coating process based on the quality of the measured coating.

In other embodiments, the automatically generated data may be automatically displayed on the visual display, and the coating process may be automatically adjusted using the feedback loop. This may enable user intervention to override the feedback loop if required, whilst maintaining an automatic procedure when there is no user override.

Alternatively, the automatically generated data may be automatically displayed on the visual display, and in certain instances may require a user to confirm that the feedback loop should automatically adjust the coating process. This gives the user a decision to override any change to the coating process, which may be important for instances when the coating process is to be changed drastically.

According to a second aspect there is provided a method for creating a correlation model, for automatically determining one or more properties of a coating material, the method comprising: using spectroscopy to acquire spectra of a plurality of coating materials; applying signal pre-processing to the acquired spectra; creating a correlation model using the pre-processed spectra wherein the correlation model correlates the spectra to one or more properties of the coating material.

Preferably, the correlation model is created using chemometric analysis. This may include using neural network architecture. Alternatively, it may comprise using partial least squares (PLS). In some embodiments it may comprise using a self-learning function. The self-learning function may be used to determine the optimum signal pre-processing. Alternatively, it may be to determine the spectra to use in the model creation. The self-learning function may be genetic algorithms in some embodiments, or any other type of dictionary learning. In other embodiments creating the correlation model may comprise any combination of chemometric methods including; principle component analysis (PCA), neural networks, genetic algorithms, dictionary learning, alternating least squares method (ALS) and the method of partial least squares (PLS).

Preferably, the correlation model is validated using validation spectra. The validation spectra are spectra of coating materials with known different levels of polymerisation to the spectra used to create the correlation model. The validated spectra are used to test the correlation model.

The correlation model may be tested using any of a coefficient of determination ($R^2$), cross validation, Root Mean Square Error of Cross-Validation (RMSECV), inspection of residuals, root-mean-square error (RMSE), from the correlation model. In some embodiments the coefficient of determination may be between 0.81 to 0.88.

The acquired spectra of a plurality of coating materials may be spectra from a range of coated objects, with different polymerisation levels. For instance, the range of objects may have been passed through a coating chamber at a range of different speeds. This ensures that the coating of the ranges of objects are different to one another. For instance, the polymerisation level of the coating will be different for objects that have been passed through the coating apparatus at different speeds.

This creation of the correlation model may be carried out on a range of spectrometers.

Preferably, the one of more properties of coating material used to create the correlation model are measured using destructive traditional tests. For instance, this may include using any of the following tests: Tangent delta (TgD), Differential Scanning calorimetry (DSC), dissipation factor, solvent retention, bonding strength, mechanical stress (torsion, bending, elongation), and cohesion, as are known in the art. These tests characterise the different physical, electrical, and chemical properties of the coating material which can relate to its polymerisation.

The signal pre-processing may be any pre-processing as mentioned above for the first aspect.

The correlation model may be used to assess the quality of the coating according to the method of the first aspect.

According to a third aspect there is provided an apparatus for positioning a spectrometer probe adjacent to a wire, wherein the probe is configured to acquire spectra used to automatically determine one or more properties of wire coating material in real time, the apparatus comprising; a channel for receiving coated wire; a probe holder for holding the probe adjacent to the channel, such, that in use, the probe measures the properties of the polymer coating and automatically generates data for substantially real time control of the wire coating process in dependence on the measured properties.

Having the probe adjacent to the wire enables it to emit light to be incident on the wire coating of the wire being tested. Advantageously, the apparatus enables a spectroscopic probe to be securely positioned relative to a wire that has been coated. This enables repeatable measurements to be obtained, as the probe can be held in a fixed position relative to the wire that is received in the channel.

Preferably, the channel comprises a first end where the wire is inserted into the apparatus, and a second end where the wire exits the apparatus. Coated wire can be fed into the first end of the apparatus, with the probe acquiring the spectra of the coating material before it exits the apparatus. Advantageously, this allows the coating material of the length of wire that has been coated to be tested, as it passes through the apparatus.

Preferably, the apparatus further comprises a first set of pulleys located between the first end of the channel and the second end of the channel. The coated wire can be received by the pulleys, which help guide the wire between the first and second end of the channel. The pulleys ensure that the wire is maintained at a fixed position within the channel.

The apparatus may comprise a second set of pulleys located between the first set of pulleys and the second end of the channel. The second set of pulleys may perform the same task as the first set of pulleys, by guiding the wire through the channel. Having a second set of pulleys provides support to the wire as it is fed through the apparatus, preventing the wire from drooping or snagging.

In some embodiments, the apparatus may further comprise a third set of pulleys located at the first end of the channel, and a fourth set of pulleys located at the second end of the channel. The third and fourth set of pulleys provide a guide for the wire entering and leaving the apparatus, to ensure that the wire enters and exits the channel. Alternatively, in some embodiments, there may be a set of pulleys located at the first end of the channel, and no pulleys located at the second end of the channel. In other embodiments, there may be a set of pulleys located at the second end of the channel, and no pulleys located at the first end of the channel.

Preferably, each set of pulleys comprise a first pulley and a second pulley. In some embodiments each of the first, second, third and fourth set of pulleys may comprise a first and a second pulley. In other embodiments the first, second, third and fourth set of pulleys may comprise any number of pulleys. The first and second pulley may be disposed either side of the channel. Advantageously, this enables the wire to pass between the first and second pulley to help guide the wire through the channel.

Preferably, the second pulley is arranged on a biasing member to move the second pulley relative to the first pulley, such that the apparatus can accommodate coated wires with a range of thicknesses. The second pulley may have a set preferred position at which it is located relative to the first pulley, which the biasing member ensures it returns to. Upon receiving a wire into the apparatus the second pulley may be moved from this preferred position by the force of the wire acting against the biasing member. Advantageously, this means that the apparatus can be used with wires with a range of thicknesses, whilst ensuring that the pulleys remain in contact with the wire, to enable it to perform its function. This guarantees a constant distance of the probe from the wire, whilst not causing any destructive or mechanical stress. In some embodiments the biasing member may be a spring.

Alternatively, both the first and second pulleys may be arranged on a biasing member to move the second pulley relative to the first pulley. Although it is preferable that the second pulley of each of the first, second, third and fourth sets of pulleys are arranged on a biasing member, in some embodiments this might not be so. For instance, in some embodiments the second pulley of the third and/or fourth set of pulleys may not be movable relative to the first pulley. Where the set of pulleys only comprise a single pulley, this preferably will not be arranged on a biasing member.

Preferably, the third and fourth set of pulleys are arranged perpendicular to the first set of pulleys, such that the axis of rotation of the third and fourth set of pulleys is perpendicular to the axis of rotation of the first set of pulleys. For instance, the axial length of the third and fourth set of pulleys is in a plane perpendicular to the axial length of the first set of pulleys. This ensures that the wire fed through the channel is guided in every orientation, i.e. above and below, and on each side of the channel. This ensures that the wire is kept on a fixed path within the apparatus. Alternatively, or in addition, the first set of pulleys are arranged co-axial to the second set of pulleys, such that the axis of rotation of the first and second set of pulleys is co-axial to one another. For instance the first and second set of pulleys may be located in the same plane to one another. Alternatively, or in addition, the third set of pulleys are arranged co-axial to the fourth set of pulleys, such that the axis of rotation of the third and fourth set of pulleys is co-axial to one another. Having sets of pulleys that are co-axial to one another and sets of pulleys perpendicular to one another further enables the wire to be supported in every direction.

Alternatively, or in addition the third and fourth set of pulleys may be arranged perpendicular to the second set of pulleys, such that the axis of rotation of the third and fourth set of pulleys is perpendicular to the axis of rotation of the second set of pulleys.

In some embodiments, the pulleys preferably comprise a groove for receiving the coated wire. This is desirable in embodiments for use on round wire. The grooves provide a region for receiving the wire, ensuring that the wire does not slip off the pulley. In other embodiments, the pulleys are rounded cylindrical pulleys. Having cylindrical pulleys is preferable in embodiments for use on flat wire.

Preferably, the apparatus comprises a platform arranged above the channel on which the probe holder is housed. The platform provides a region in which the probe holder can hold the probe at the fixed distance relative to the channel.

Preferably, the platform comprises an adjustment mechanism for moving the probe holder, to adjust the position of the spectrometer probe relative to the channel. Being able to adjust the position of the probe holder on the platform ensures that the probe is positioned over the desired portion of the coated wire. Preferably, the adjustment mechanism comprises a threaded screw. The adjustment mechanism may further comprise a plurality of biasing members that work against the screw to maintain the probe holder in position. In some embodiments, the probe holder may further comprise a plurality of holes, and the platform having corresponding attachment pegs that are configured to be received in the holes. Upon actuating the adjustment mechanism the pegs move within the holes to permit the probe holder to be moved. This limits the movement of the probe holder, to ensure it does not move too far.

Preferably, the probe holder comprises a plurality of holes for receiving the spectrometer probe. Each of the holes may be arranged at different angles relative to one another, to allow the spectrometer probe to be positioned at a range of orientations relative to the channel. Advantageously, this allows the optimum positioning to be used for each wire coating material.

Preferably, there are three holes orientated at 90°, 85°, and 80° relative to the channel. In other words, orientated relative to the length of the channel, i.e. between the first and second end of the channel. The three holes hold the probe at 90°, 85°, and 80° relative to the channel, respectively. In other embodiments there may be more or fewer holes, with a range of orientations.

Preferably, the apparatus further comprises a housing which encloses the channel. This aids in the aesthetic appeal of the apparatus, and provides protection to the inner components of the apparatus. Preferably, the housing comprises a cut-away portion for receiving the probe holder. The housing may further comprise a cut away portion at the first and second end of the channel. This allows the probe to be inserted into the probe holder, and the wire to be inserted into the channel whilst the housing is in place.

In some embodiments, the housing may comprise a first region and a second region, the first region movable relative to the second region, to enable access inside the housing. For instance, the first region may be attached to the second region via one or more hinges. Advantageously, this is desirable to enable access to any blockages within the housing.

Preferably, the apparatus further comprises attachments to securely attach the probe holder to the housing. The attachments may comprise a plurality of screws and/or bolts and complementary threaded holes for receiving said screws and/or bolts. The attachments may be on the side walls of the housing, and/or the bottom of the housing. In an alternative embodiment, the probe holder may be welded to the housing.

Preferably, the spectrometer probe is a NIR probe. The spectrometer probe may be a conventional NIR probe. Alternatively, it may be customised for the purpose.

Preferably, the one or more properties include the polymerisation of the wire coating, as mentioned previously. Although any other property as mentioned previously could be used.

Preferably, the apparatus is used when performing the method of the first or second aspect.

According to a fourth aspect there is provided a wire coating system, for automatically controlling one or more properties of wire coating material, comprising: the apparatus of the third aspect; a wire coating apparatus; a spectrometer probe; a spectrometer, comprising: a computing unit; and an operator interface; and a wire.

Alternatively, in some embodiments the wire coating system may not comprise an operator interface.

Advantageously, the wire coating system is automatically controllable to ensure that quality of wire coating applied to the wire is of a sufficient quality.

Preferably, the system is configured to perform the method of the first aspect.

According to a fifth aspect there is provided an apparatus for automatically determining one or more properties of polymer coating applied to an object, the apparatus comprising; a spectrometer probe that, when in use, is positioned adjacent to the object, wherein the probe is configured to acquire spectra used to automatically determine one or more properties of the polymer coating in real time; and a probe holder that, when in use, holds the probe adjacent to the object, such that, in use, the probe measures the properties of the polymer coating.

Preferably, the apparatus may be configured to perform the method of the first aspect.

According to a sixth aspect there is provided an object coating system, for automatically controlling one or more properties of coating material, comprising: the apparatus according to the fifth aspect; a coating apparatus; a spectrometer probe; a spectrometer, comprising: a computing unit; and an operator interface; and an object.

Preferably, the system is configured to perform the method of the first aspect.

DRAWINGS

FIGS. 3A and 3B show close up views of the second set of pulleys inside the first embodiment of the wire testing apparatus for testing round wires;

FIGS. 5A and 5B show close up views of the third set of pulleys inside the second embodiment of the wire testing apparatus for testing flat wires;

FIG. 6 shows a rear perspective view of the second embodiment of the wire testing apparatus for testing flat wires;

FIG. 9 shows NIR spectra of three wire coatings;

DETAILED DESCRIPTION

Figure 1:
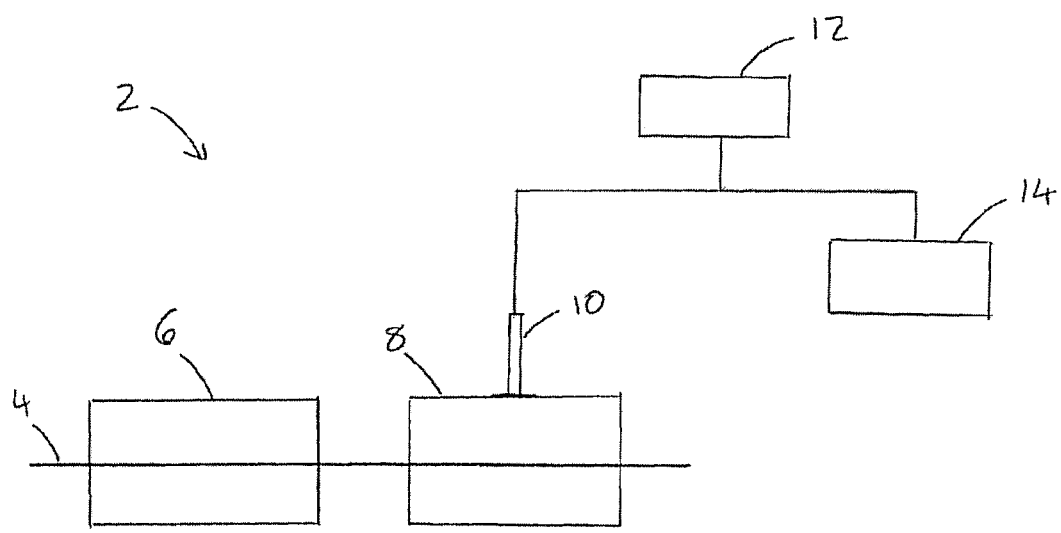
FIG. 1 shows a wire coating system according to an embodiment.

FIG. 1 shows an embodiment of a wire coating system 2. The coating system comprises a coating chamber 6, and a wire coating testing apparatus 8 in which a spectroscopic probe 10 is housed. The spectroscopic probe 10 is connected to a spectrometer 12, which controls an operator interface 14.

The wire 4 is passed through the coating chamber 6 where polymer coating is applied to the wire 4. The coated wire 4 is then passed into the wire testing apparatus 8 where the probe 10 acquires spectra of the coating material. The wire 4 is then passed out of the wire testing apparatus 8, and may either pass through the coating chamber 6 again if a second coat is required, or may be stored, for instance on a spool. The spectra is processed and analysed by the spectrometer 12. The results, which are quality indicators of the coating material, may be displayed on the operator interface 14, and/or may be used to automatically change the coating parameters, as will be discussed in more detail below.

Typically, the number of coating passes through the coating chamber 6 is greater than two, as a number of layers of coating are desired. In some instances, the layers may include 9 layers, including initial layers of enamel with self-bonding layers on top of these enamel layers. Any number of layers as may be required may be used.

Advantageously, a non-destructive, fast and inexpensive technique is provided for determining the quality of the coating material.

Figure 2A:
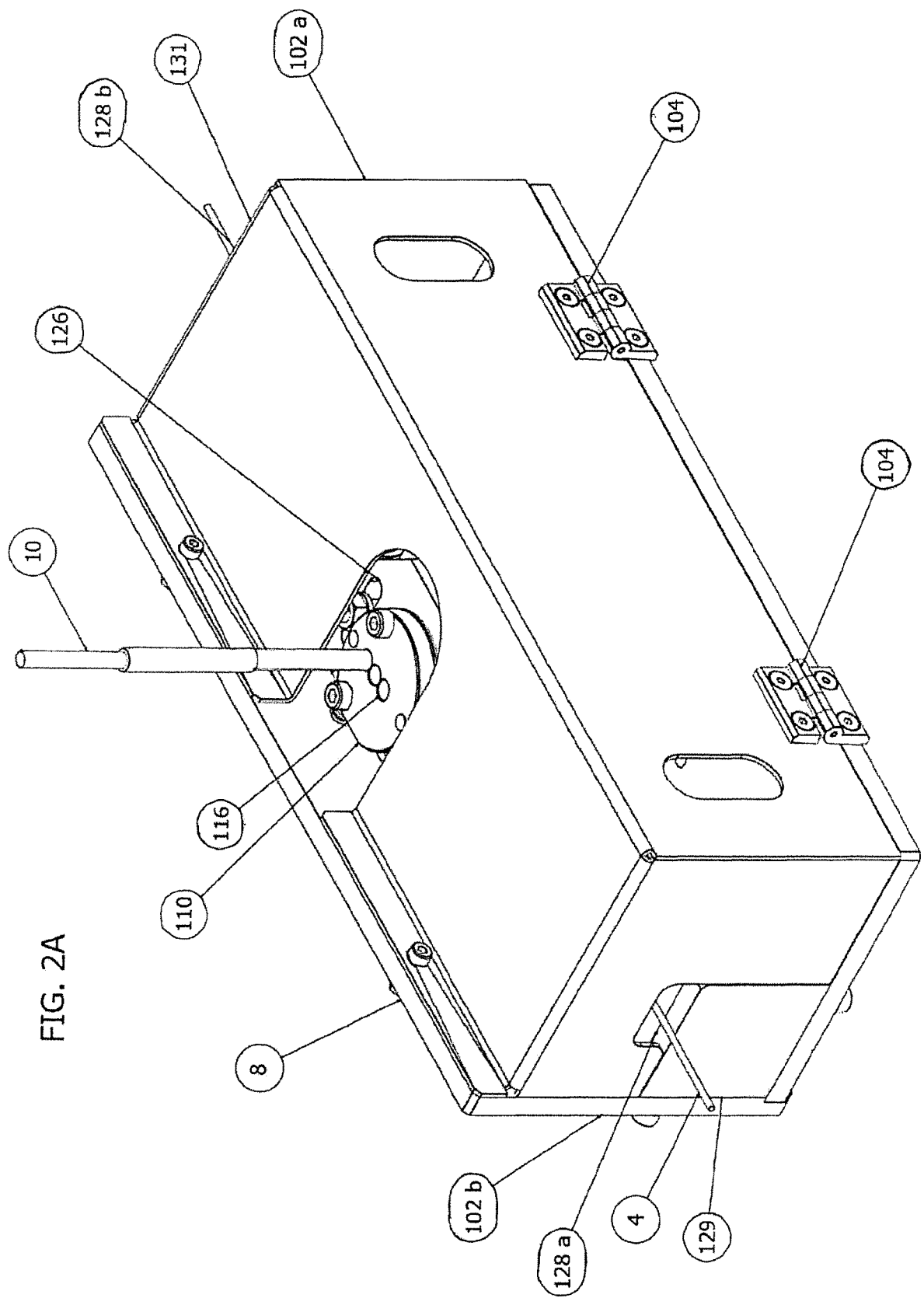
FIG. 2A shows a top down perspective view of a first embodiment of a wire testing apparatus for testing round wires.
Figure 2B:
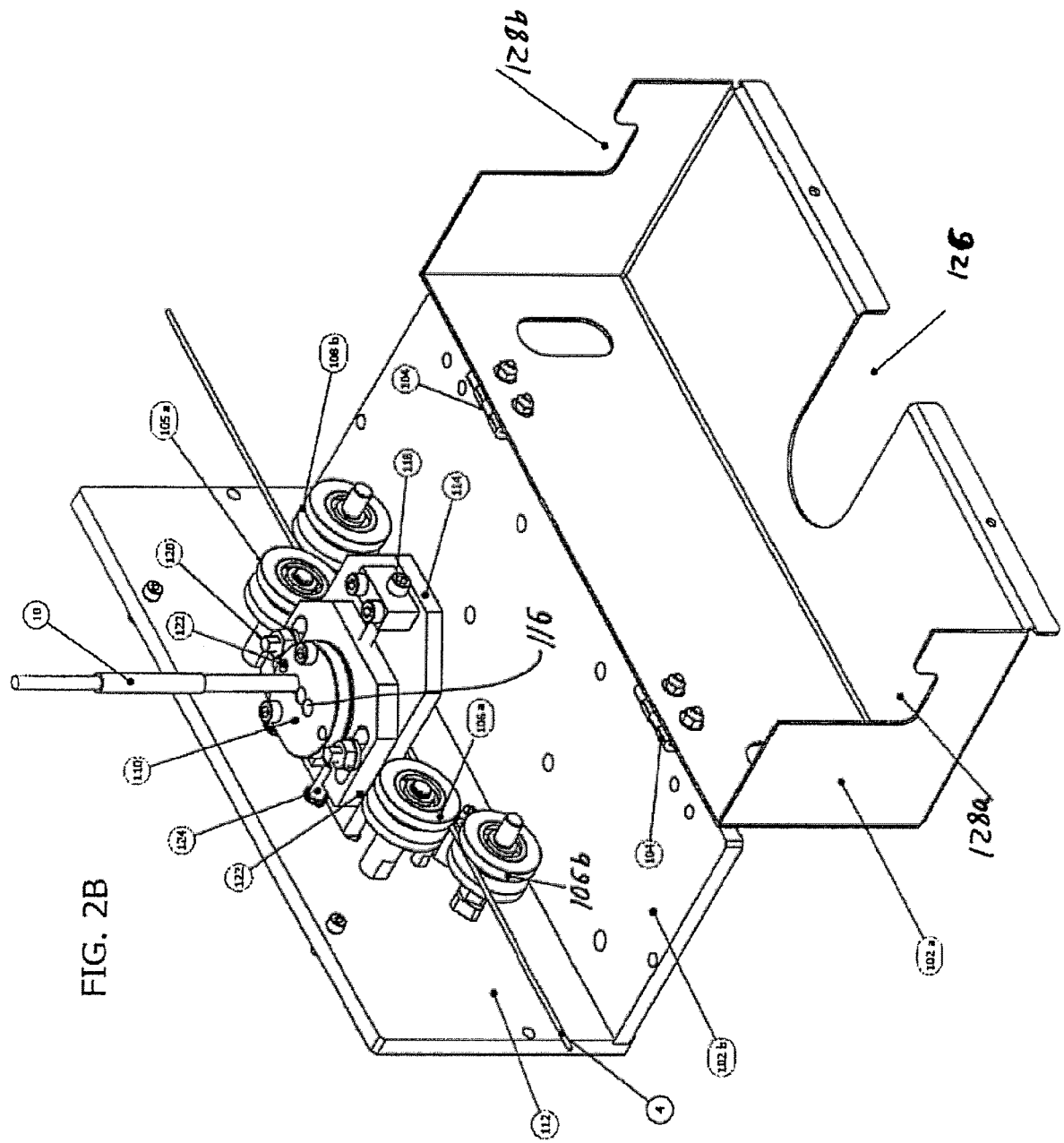
FIG. 2B shows a side on top down perspective view of the inside of the first embodiment of a wire testing apparatus for testing round wires.

FIGS. 2A to 2D show various orientations of an embodiment of a wire coating testing apparatus 8 for use with wires that have a substantially circular, or round, cross-section, that are referred to herein as round wires. FIG. 2B shows the inside of the apparatus 8, which comprises a housing 102 comprising a first part 102a and a second part 102b, the first and second parts attached via hinges 104. The first part 102a movable relative to the second part 102b to enable access inside the housing 102. The second part 108b is formed of two plates attached together arranged orthogonal to one another. Advantageously, this enables easy access to components within the housing for maintenance purposes. The only difference between the apparatus shown in FIGS. 2A and 2B is the minor variation in the housing 102, which is a design modification.

Figure 2C:
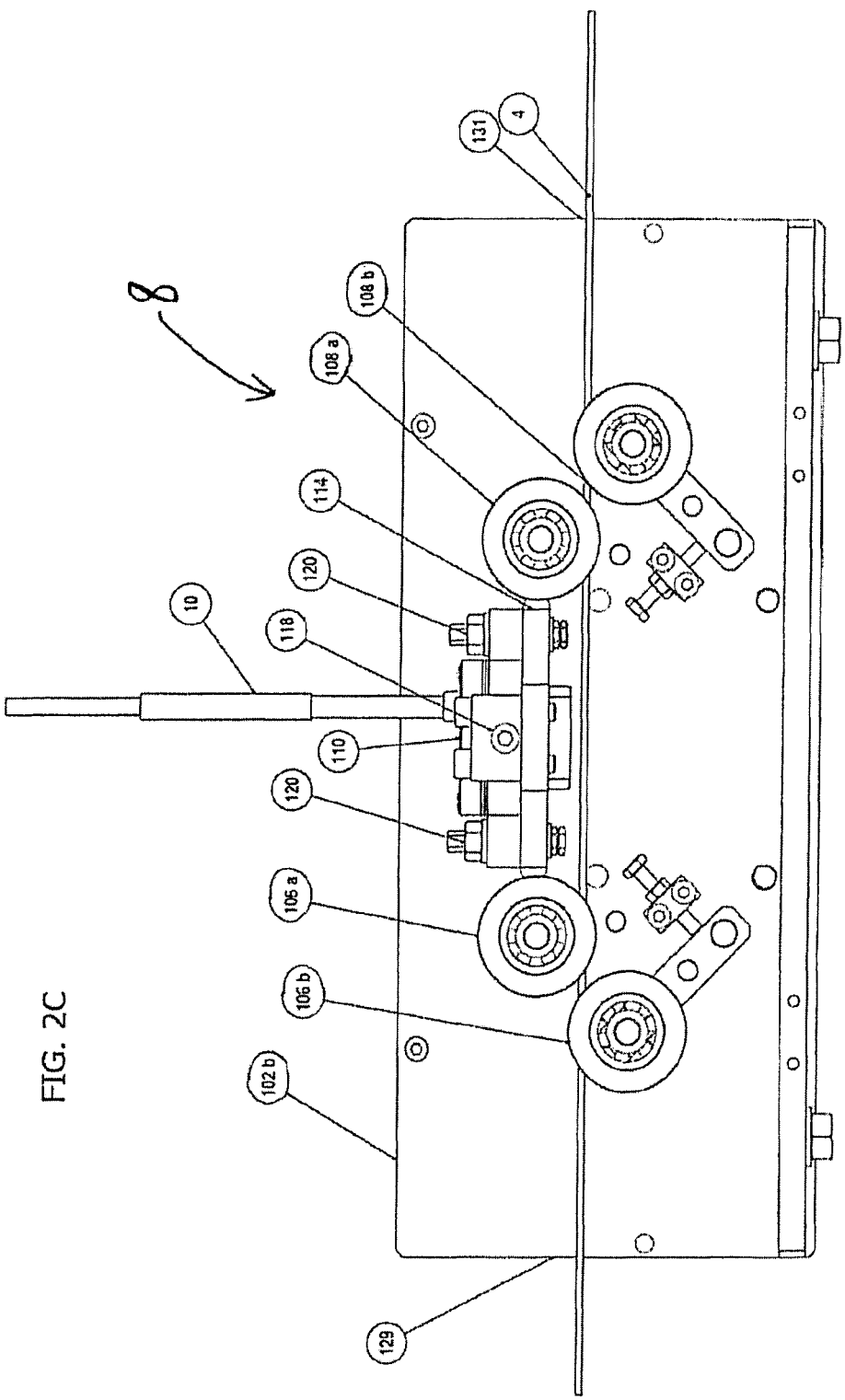
FIG. 2C shows a side on view of the inside of the first embodiment of a wire testing apparatus for testing round wires.
Figure 2D:
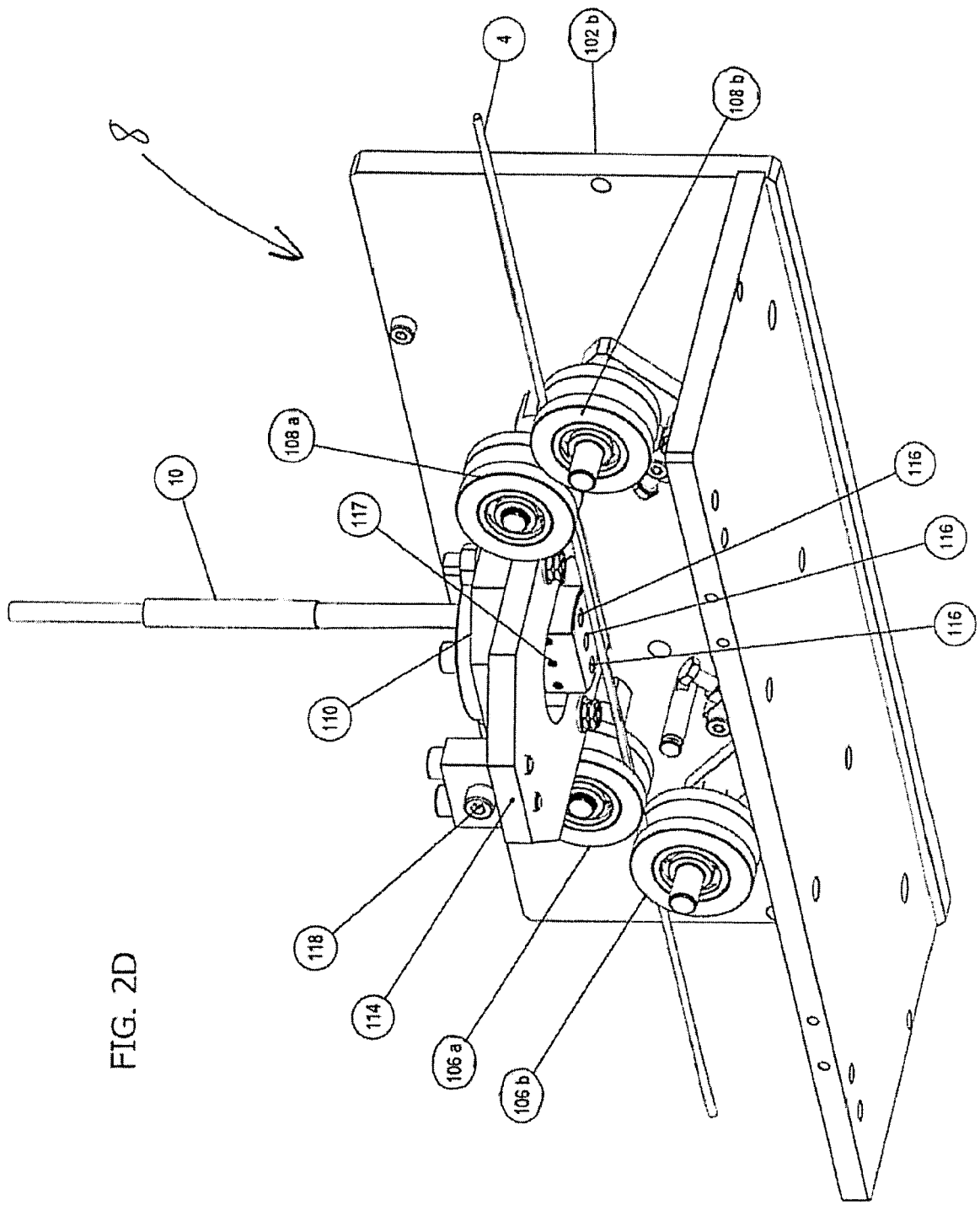
FIG. 2D shows a bottom up perspective view of the inside of a first embodiment of the wire testing apparatus for testing round wires.

FIGS. 2C to 2D show different perspective views of the inside of the testing apparatus 8 where the first part of the housing 102a has been removed from the apparatus 8. The apparatus 8 comprises a first set of pulleys 106 and a second set of pulleys 108. The pulleys define a channel 112 through the apparatus 8. The first set of pulleys 106 comprise a first 106a and a second pulley 106b, and the second set of pulleys comprise a first 108a and a second 108b pulley. The pulleys 106a 106b, 108a, 108b each have a groove around their circumference, for receiving the round wire 4, ensuring that the wire 4 does not slip off the pulley 106a 106b, 108a, 108b. Each first pulley 106a 108a is offset along the length of the channel 112 relative to its corresponding second pulley 106a 108b, for instance the first pulleys 106a 108a are closer to one respective end of the channel 112 than their respective second pulley 106b 108b. This ensures that the wire 4 is supported by the pulleys 106 108 over a long portion of the length of the wire 4.

A probe holder 110 is located between the first 106 and second 108 set of pulleys. The probe holder 110 is housed on platform 114 arranged above the channel 112. As can clearly be seen in FIGS. 2A and 2B the probe holder 110 comprises three holes 116 for receiving the probe 10, in the example shown in FIG. 2B the probe 10 is in the middle hole 116, and in the example shown in FIG. 2A the probe 10 is in the hole 116 closest to the second set of pulleys 108.

FIG. 2D shows a bottom up perspective view of the apparatus 8. As can be seen in FIG. 2D, the platform 114 comprises a aperture 117 through which a portion of the probe holder 110 can extend. In addition holes 116 extend entirely through the probe holder 110. Advantageously, having the aperture 117 in the platform 114 and the holes 116, means that when the probe is inserted into a hole 116 there is an uninterrupted transmission and/or detection path between the probe 10 and the channel 112.

The platform comprises an adjustment screw 118, and pegs 120. The pegs 120 are received in slots 122 on the probe holder 110. Although they cannot be seen from FIGS. 2A-2D a plurality of springs 124 are located on the probe holder 110.

The adjustment screw 118 can be used to move the probe holder 110 on the platform 114. This enables the positioning of the probe 10 to be adjusted relative to the channel 112. Upon actuating the screw 118 the probe holder 110 is moved against or away from springs 124. The pegs 120 move within the slots 122 to ensure the probe holder only moves in the set direction by a specific amount.

FIG. 2A shows the wire testing apparatus 8 of FIG. 2B in normal operating mode, with the housing 102 closed. The first section of the housing 102a has a cut away portion 126 which allows the probe holder to be accessible when the housing is closed. Cut away portions 128a and 128b define first 129 and second end 131 of the channel 112, respectively.

Coated wire 4 is passed through apparatus 8 to determine the quality of the wire coating. The wire 4 is passed through cut away portion 128a and is received on pulleys 106 which pull and guide the wire underneath probe holder 110 and platform 114. Spectra are then taken of the wire coating using probe 10, before the wire 4 is then received on the second set of pulleys 108, before exiting the apparatus 8 through cut away portion 128b. The spectra acquired can be used to determine the quality of the wire coating and/or provide feedback to adjust the parameters of a wire coating process, as will be discussed in more detail below.

FIGS. 3A and 3B show close up views of the second set of pulleys 108 of the apparatus 8 of FIG. 2. As can be seen, the second pulley 108b is arranged on arm 130, which is attached to the wall of the second section of the housing 102b. A spring is attached between pin 132 and pin 131, which causes the arm to pivot.

As can be seen in FIG. 3A the wire 4 is in contact with the first 108a and the second pulley 108b. In this arrangement the apparatus 8 is in its operational mode.

In FIG. 3B the second pulley 108b is no longer in contact with the wire 4 the arm 130 has pivoted against the bias of the spring between pin 132 and pin 131. The force applied to the pulley 108b is greater than the force of the spring which acts to push the pulley 108b back to its original position relative to the first pulley 108a.

Advantageously, having this set up enables the apparatus to accommodate wires 4 of various sizes. Upon inserting the wire 4 into the apparatus 8, if the thickness of the wire 4 is greater than the distance between the first and second pulleys 108a 108b the second pulley 108b will be moved against the biasing of the spring to increase the distance between the first and second pulleys 108a 108b. It is desirable that the default distance between the first and second pulleys 108a 108b is set to be no larger than the smallest thickness of wire 4 to be coated. Otherwise when thin wire 4 is to be tested both pulleys 108a 108b would not be in contact with the wire 4. Screw 138 acts as a stop for the arm 130 to ensure the pressure exerted by the pulleys 108a 108b on the wire is not too much. This ensures the pulleys 108a 108b are maintained at a distance to one another that ensures the pulleys 108a 108b are able to continue to rotate, whilst not putting too much stress on the wire. This may be advantageous where the wire is thin and liable to be damaged.

The first set of pulleys 106 have a corresponding spring mechanism to permit movement between the first 106a and second pulley 106b, in the same way as the second set of pulleys 108 as described above.

The pulley system in the wire coating apparatus 8 shown in FIGS. 2 to 3 would typically accommodate round wires from 1.5 mm up to 5 mm in diameter for systems where no collimator is used. When a collimator is used wire with a diameter of 0.1 mm to 5 mm can be used. However, if wires of larger or smaller size are to be tested the apparatus can be modified accordingly.

Figure 4A:
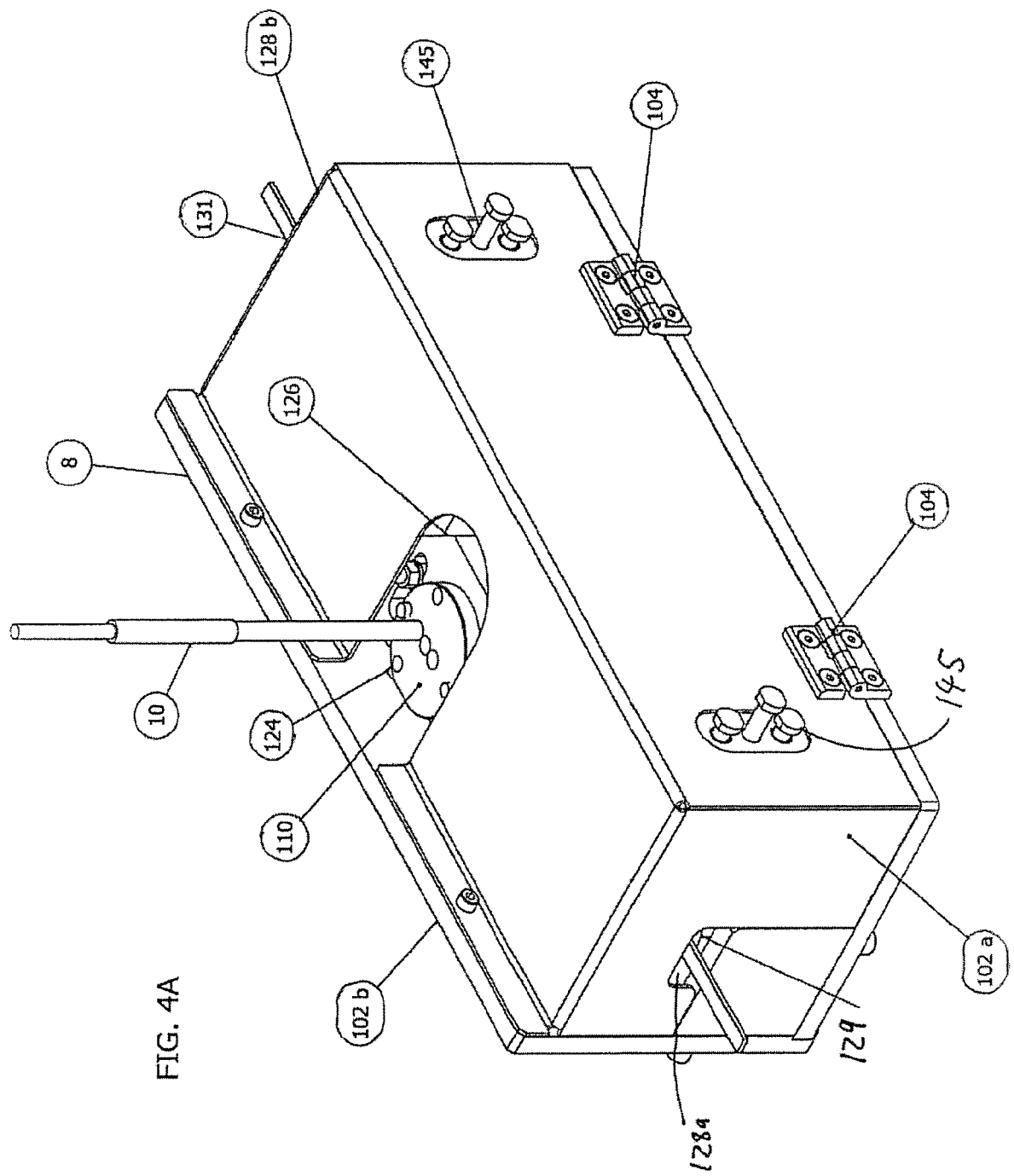
FIG. 4A shows a side on top down perspective view of the inside of a second embodiment of the wire testing apparatus for testing flat wires.
Figure 4B:
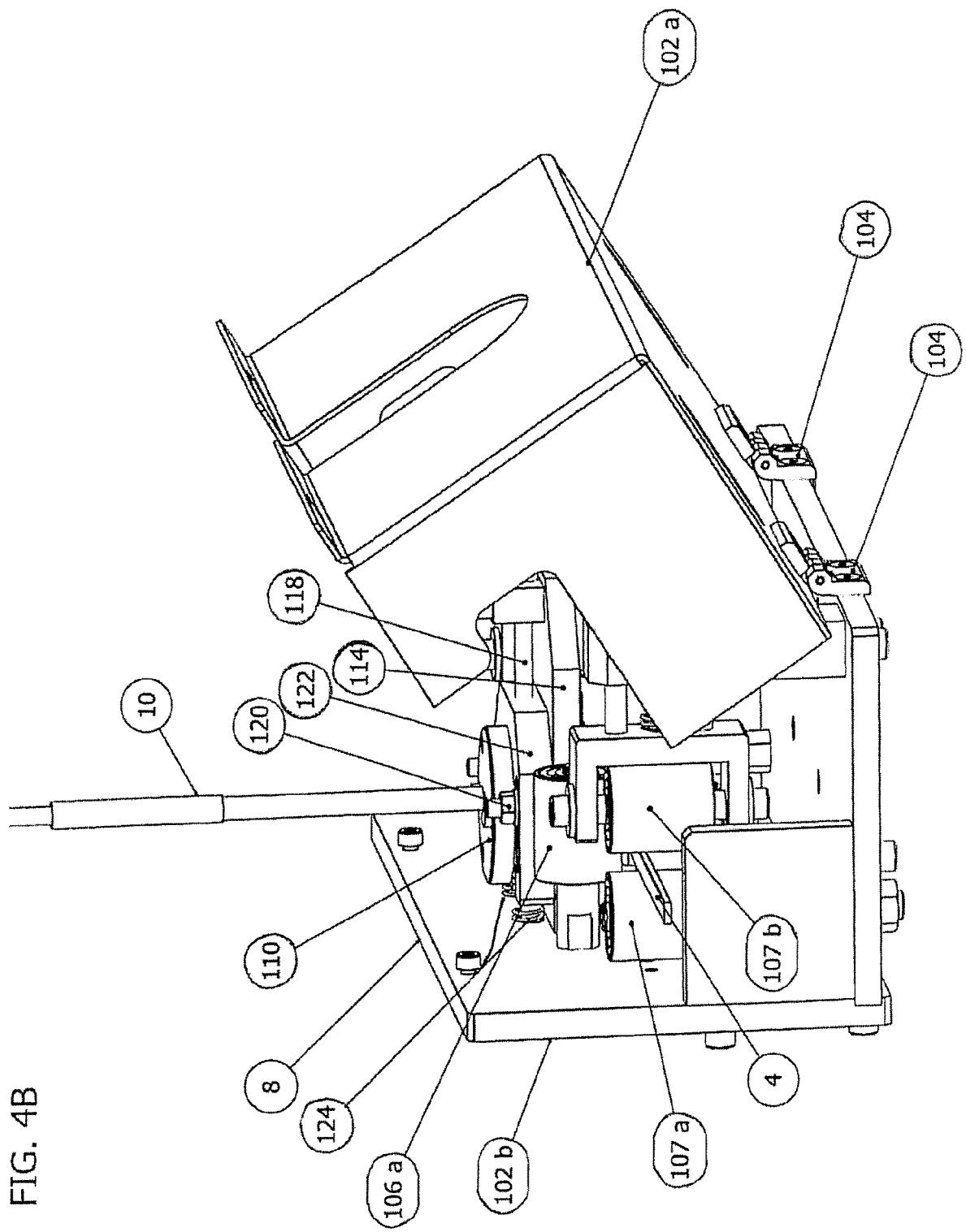
FIG. 4B shows a side on perspective view of the inside of a second embodiment of the wire testing apparatus for testing flat wires.
Figure 4C:
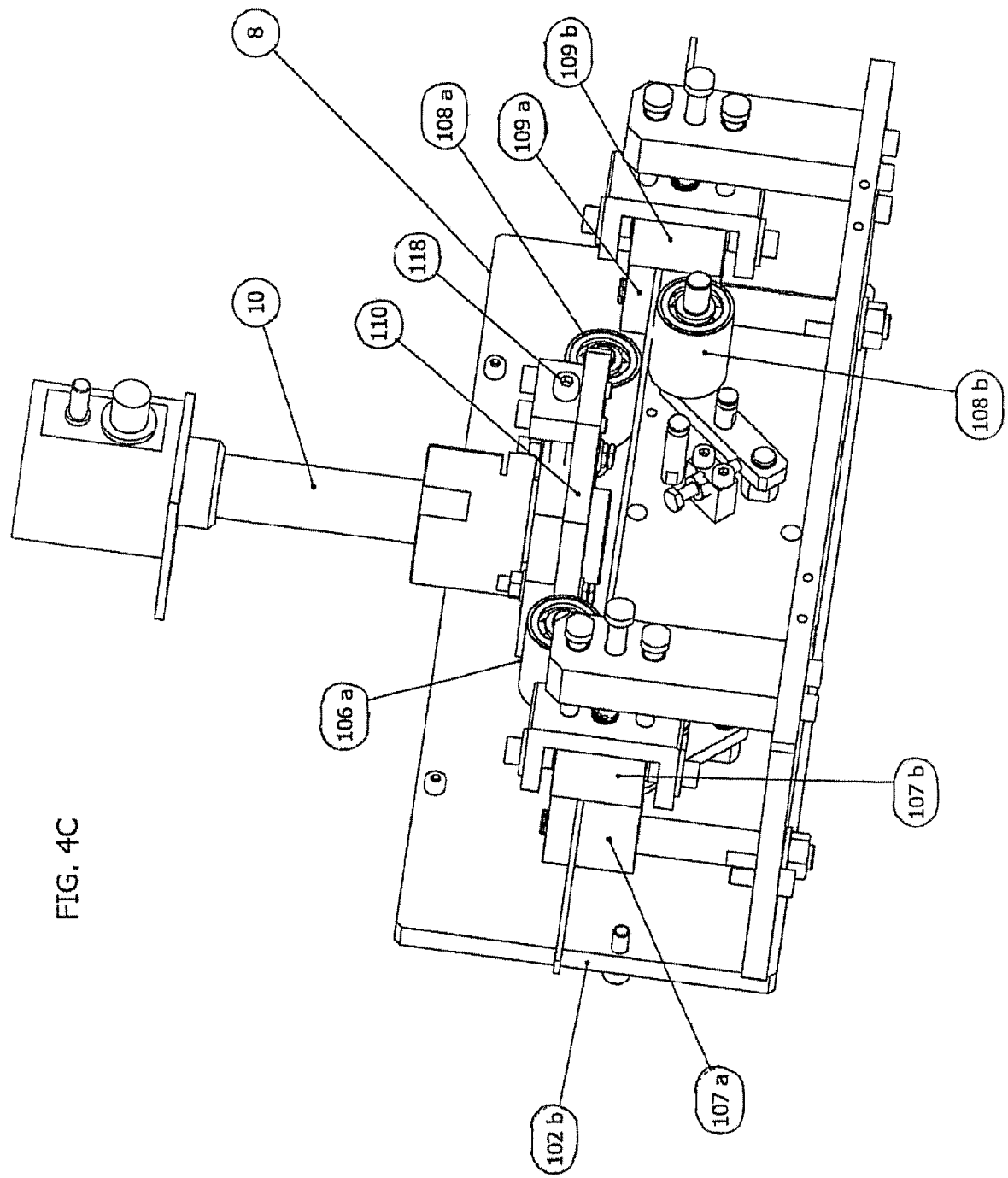
FIG. 4C shows a side on perspective view of the inside of a second embodiment of the wire testing apparatus for testing flat wires.

FIGS. 4A-4C show an example wire coating testing apparatus 8 for use on flat wires. FIG. 4B shows the inside perspective view of apparatus 8, which has housing 102 comprising a first part 102a and a second part 102b, attached via hinges 104, as with the apparatus 8 of FIG. 2.

FIG. 4C shows a further inside perspective view of the testing apparatus 8, where the first part of the housing 102a has been removed from the apparatus 8. As can be seen, the apparatus 8 comprises a first set of pulleys 106 and a second set of pulleys 108. The first and second set of pulleys 106 108 are the same as in the apparatus 8 in FIG. 2, except that they do not comprise a groove for receiving the wire 4. In addition, the apparatus in FIG. 4A-C comprises a third set of pulleys 107 and a fourth set of pulleys 109. The third set of pulleys 107 are located at the first end of the channel 129 and the fourth set of pulleys 109 are located at the second end of the channel 131. The third set of pulleys 107 include a first pulley 107a and a second pulley 107b, and the fourth set of pulleys 109 include a first pulley 109a and a second pulley 109b.

The third and fourth set of pulleys 107 109 are arranged in a plane perpendicular to that of the first and second set of pulleys 106 108, such that each of the third and fourth set of pulleys 107 109 are arranged either side of the channel 112 and each of the first and second set of pulleys 107 109 are arranged above and below and the channel 112. Advantageously, having the pulleys in different orientations to one another prevents the movement of the wire 4 in two axis, with the first and second set of pulleys 106 108 preventing the wire 4 from moving vertically within the apparatus 8, and the third and fourth set of pulleys 107 109 preventing the wire 4 horizontally within the apparatus 8.

The probe shown in FIG. 4C is different to the probe shown in FIG. 4A. This is to illustrate that different probes can be used, by changing the probe holder 110.

Specifically, the probe shown in FIG. 4A has a transmission fiber(s) path inside the probe for transmitting light from the source (lamp) to the observed material, and a detection fibre that detects the reflected signal transmitting it to the spectrometer. However, the probe shown in FIG. 4C has in-built source (lamp), and has only one fibre that is used for detecting the reflected signal to the spectrometer, no transmission fibre is needed. It is to be understood that the invention can work with either type of probe.

Although either type of probe shown in FIGS. 2A and 4C can be used for any wire types or sizes there are advantages with using one probe over the other. Both probes are suited for testing flat wires, round wires, and wire on a spool (as will be discussed in relation to FIGS. 10A and 10B).

However, the probe shown in FIG. 2A is particularly suited for thin round wire with a diameter of less than 2 mm.

All other features of the apparatus 8 in FIG. 4A-C are common with the features shown in FIG. 2A-D.

FIG. 4A shows the wire testing apparatus 8 of FIG. 4B in normal operating mode, with the housing 102 closed.

Coated wire 4 is passed through apparatus 8 in FIG. 4A to determine the quality of the wire coating. The wire is passed through cut away portion 128*a* and is guided by the third set of pulleys 107 which pull and guide the wire 4 into the apparatus 8. The wire 4 is then passed onto the first set of pulleys 106 which pull and guide the wire 4 underneath probe holder 110 and platform 114. Spectra are then taken of the wire coating using probe 10, before the wire 4 is then received on the second set of pulleys 108 which guide and pull the wire 4. The wire 4 is then received on the fourth set of pulleys 109 which guide the wire 4 to exit the apparatus 8 at the second end 131 of the channel through cut away portion 128*b*. The spectra acquired can be used to provide feedback to adjust the parameters of a wire coating process as will be discussed in more detail below.

Although not shown in a separate figure, the first 106 and second set of pulleys 108 of the apparatus 8 shown in FIG. 4A-4C, has the same spring mechanism as discussed for the apparatus 8 shown in FIGS. 3A and 3B.

FIGS. 5A and 5B show close up views of the third 107 set of pulleys. As can be seen, the second pulley 107*b* of the third set of pulleys 107, is attached to housing 139, the housing 139 is attached via three rods 140 which are each received in holes within stand 142. Stand 142 is firmly connected to the second section of housing 102*b*. The middle of the three rods 140*a* has a spring 144 biasing between the stand 142 and the housing 139.

As shown in FIG. 5A the wire 4 is in contact with the first 107*a* and the second 107*b* pulley of the third set of pulleys 107. Conversely, in FIG. 5A the second pulley 107*b* has moved relative to the first pulley 107*a* such that the wire 4 is no longer in contact with the second pulley 107*b*. This is achieved by the pulley 107*b* and housing 139 moving on rods 140, with the rods 140 moving through the holes in the stand 142. This enables wires 4 of a variety of sizes to be accommodated in apparatus 8, as the spacing between the first and second pulley 107*a* 107*b* of the third set of pulleys, can be varied. Spring 144 provides a bias between the housing 139 and the stand 142 to ensure that housing cannot be pushed too close with respect to stand 142. Furthermore, spring 144 may enable the second pulley 107*b* to return to its resting position to ensure that the apparatus can be reset for use on small wires after larger wires have been passed through the apparatus 8.

A corresponding identical arrangement is present in the fourth set of pulleys 109, for moving the second pulley 109*b* relative to the first pulley 109*a*.

This spring pulley arrangement can enable wires with diameters of up to 22 mm to be accommodated within the system. However, if larger wires are to be tested, the apparatus can be modified to accommodate these larger wire types.

It is desirable that the default distance between the first and second pulleys 107*a* 107*b* is set to be no larger than the smallest thickness of wire 4 to be coated. Otherwise, when thin wire 4 is to be tested, both pulleys 107*a* 107*b* would not be in contact with the wire 4.

In other embodiments any number of rods 140 may be present, and springs 144 may be present on any number of the rods 140. Furthermore, in any of FIGS. 3A, 3B, and 5A, 5B the first pulley 106*a* 107*a* 108*a* 109*a* may be the pulley arranged to move, rather than the second pulley 106*b* 107*b* 108*b* 109*b*.

As can be seen in FIG. 4A slots 145 on the first section of housing 102*a* enable rods 140 to be moveable outside of the housing 102, to enable a greater range of movement. Slots 145 are also shown in the apparatus 8 shown in FIG. 2A, which does not contain rods 140. These slots enable the same housing to be manufactured for both sets of apparatus shown in FIGS. 2A-D and 4A-C.

In other embodiments, where the first pulley of the third or fourth set of pulleys 107*a* 109*a* is movable, a corresponding mechanism as described above could be applied.

Where the first pulley of the third or fourth set of pulleys 107*a* 109*a* is not movable, it is attached to the housing through rods. Although any attachment mechanism known to a person skilled in the art could be used.

In other embodiments, any other arrangement of holding the moveable pulleys that would be known to the skilled person could be used.

FIG. 6 shows a rear view of the apparatus 8 of FIG. 4 for coating flat wires. It can clearly be seen that a number of nuts and bolts are attached to the second region of the housing. These nuts and bolt provide the attachment of the components as discussed above, such as the pulleys and the probe holder, to the housing. Advantageously, attaching the components to the housing in this way provides a secure attachment mechanism.

Typically the housing 102 of the apparatus is of the size 300 mm by 115 mm by 108 mm. However, any other dimensions could be used. Preferably parts of the housing is made of solid steel and parts are made from aluminium. However, any type of metal, or other type of material could be used.

The distance and the angle of the probe from the wire are crucial. Therefore, the apparatus 8 shown in FIGS. 2A to 6, ensures that the tests are reproducible, enables easy mounting of probes, and provides few degrees of freedom, whilst allowing adaptability to all types and sizes of wires.

Figure 7:
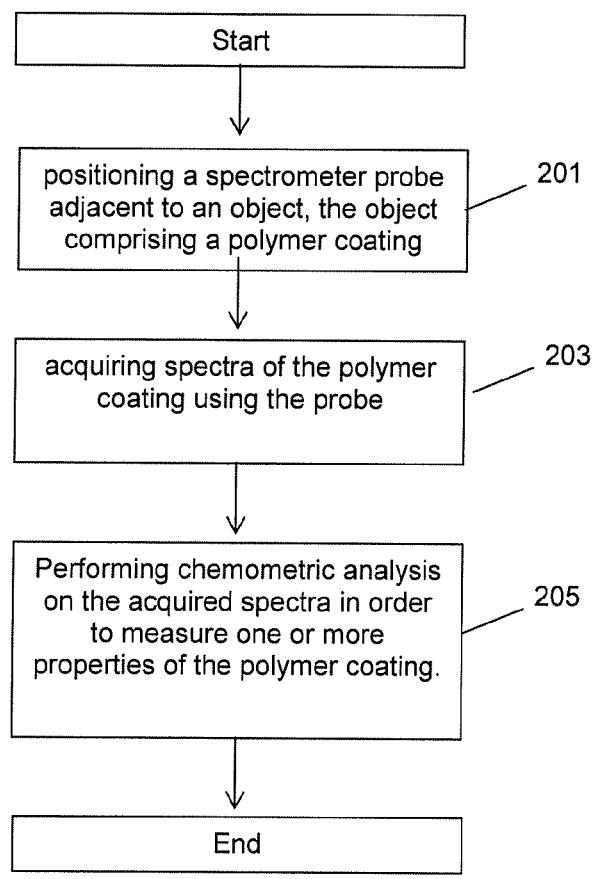
FIG. 7 is a flow chart of a method performed in a coating testing system for measuring one or more properties of a coating material.

FIG. 7 is a flow chart of a method performed in a coating testing system for measuring one or more properties of a coating material on an object.

Step 201 involves positioning a spectrometer probe adjacent to an object, the object comprising a polymer coating. At step 203 spectra of the polymer coating using the probe is acquired. Finally step 205 involves performing chemometric analysis on the acquired spectra in order to measure one or more properties of the polymer coating.

The use of the coating testing system will be described specifically in the context of a wire coating system 1 for coating and testing the coating applied to wires. Firstly the wire coating system coats a wire 4 with a polymer in a wire coating process. Spectroscopy is then used to acquire spectra to measure the properties of the polymer coating. Data is then automatically generated for substantially real time control of the wire coating process in dependence on the measured properties.

The coating of the wire 4 with a polymer can be carried out by the wire coating chamber 6 of FIG. 1. The coating chamber 6 may be any type of coating chamber 6 that is known in the art, and will not be discussed in detail here.

After having being passed through the coating chamber 6, the coated wire 4 is passed into the wire coating testing apparatus 8. The spectroscopic probe 10 is positioned so that it is close to the wire 4 when the wire is passed through the apparatus 8, as discussed in relation to the apparatus shown in FIGS. 2A to 6. Spectra of the wire coating is then acquired by the probe 10, in order to measure the properties of the polymer coating. The probe 10 may be a conventional spectroscopic probe. It is preferable that the probe is a NIR probe; however any other type of spectroscopy may be used. The probe 10 is controlled by spectrometer 12 which controls the transmission and detection of the signal from the probe 10 when acquiring the spectra. The probe emits the radiation from a halogen source and collects the NIR reflection from the sample. The probe has an internal reference, and is connected to the spectrometer 12 through optical fibres.

The spectrometer 12 is capable of processing the signal detected to enable user interface 14 to display the spectra. The spectrometer contains a diffraction grating and a CCD-sensor in the NIR wavelength range between 900 and 1700 nm. In other embodiments, a separate computing unit may be responsible for processing the data.

The setup is capable of acquiring the spectra from the moving wire coating surface without touching or interfering with the wire coating material in any way.

Based on the acquired spectra, certain properties of the polymer coating can be determined, these can then be used to automatically control and adjust the parameters involved in the wire coating in the wire coating chamber 6.

Apparatus 8 can be any of the apparatus 8 as shown in FIGS. 2A to 6. The probe 10 is positioned within the probe holder 110, which ensures that the probe 10 is held at a fixed distance from the wire 4. This enables a signal of sufficient quality to be obtained. Depending on the type and/or thickness of wire 4 to be coated, the probe 10 is inserted into one of the holes 116 on the probe holder 110, which enables the probe 10 to be orientated at a specific angle relative to the wire 4.

As outlined above, the apparatus 8 has three holes 116 at three different angles for holding the probe 10 at different orientations relative to the wire 4. The angles are 90°, 85° and 80°. The 90° orientation is designed for thick layers of coating material as light can penetrate and scatter inside the material to provide useful information. The other two orientations can be used on other wire types.

In some cases with enamelled wire, if the probe 10 is perpendicular to the wire surface, the signal can become saturated. The same holds true if the angle is greater than 85°, the signal can become saturated. If the probe 10 is at an angle smaller than 77° with respect to the wire surface, the signal may be inconsistent (with none, or lossy and noisy, information acquired).

Initially when a new wire coating is applied to a wire 4 a correlation model needs to be created. Therefore, spectra of a wire coating material can be fed into the model to determine the quality of the coating material in real time and to enable real time adjustment of parameters of the coating process.

To create the correlation model spectra are obtained of a wide range of coated wires using NIR. The spectra obtained are pre-processed and chemometric analysis used to determine the correlation model to correlate the observed spectra to the electro-physical properties of the coating material.

Figure 8:
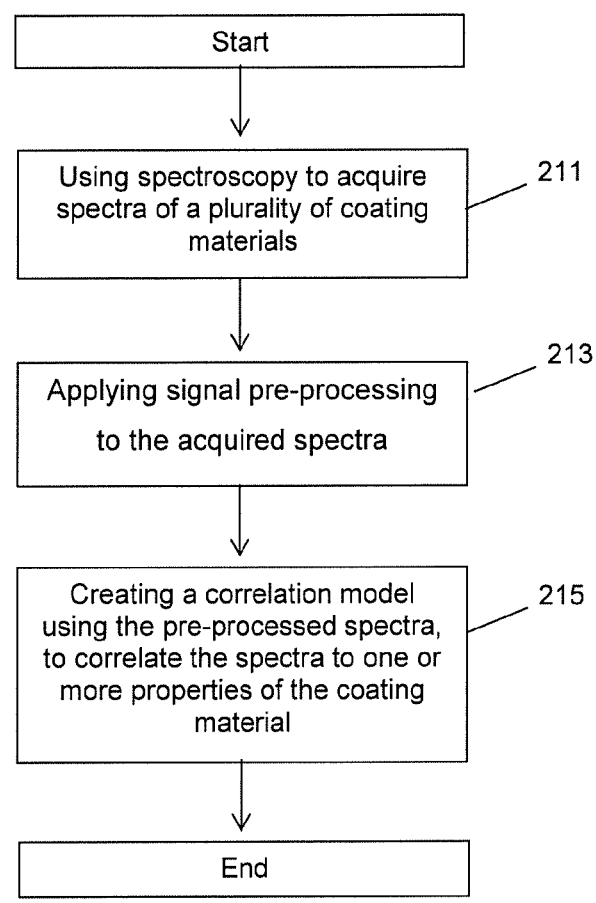
FIG. 8 is a flow chart of a method for creating a correlation model, for automatically controlling one or more properties of a coating material.

FIG. 8 shows a method of creating the correlation model for automatically controlling one or more properties of wire coating material. In step 211 spectroscopy is used to acquire spectra from a plurality of coating materials. In step 213 signal pre-processing is applied to the acquired spectra. In step 215 a correlation model is created using the pre-processed spectra, to correlate the spectra to one or more properties of coating material.

Creating the correlation model starts with acquiring spectra of a series of wires having coatings with varying levels of polymerisations to one another. One way of achieving different polymerisation levels is to vary the speed of the wire passing through the coating chamber 6 whilst keeping all of the other coating parameters constant. NIR spectra are then obtained for each of the coated wires of the sample set.

Measurement of the NIR spectra of the sample set may be carried out 'inline' where the spectra are acquired as the wire exits the coating chamber. Alternatively, the NIR spectra may be acquired at a later point in time. For instance, offline in the lab using a mechanical system that is capable of simulating wire motion on a line.

The NIR spectra that are acquired are then divided into two sample sets. The training data and the validation data.

The training data is used to create the correlation model, which is then validated (i.e. tested) using the validation data.

It is important to have validation data that is from samples with polymerisation levels that hasn't been used in the training data. This is to ensure that the validation data provides a true test of the model. For instance, the training data will not have been created with spectra from wires coated at all of the wire coating speeds, only a select number of wire coating speeds. The data from the wires coated at the other speeds is used to validate the correlation model.

When creating the model the properties (e.g. polymerisation) of the wire coating of each of the wires in the training and validation sets are determined. This can be done using well-established techniques. These include using any of the following tests: Tangent delta (TgD), Differential Scanning calorimetry (DSC), dissipation factor, solvent retention, bonding strength, mechanical stress (torsion, bending, and elongation), and cohesion, as are known in the art. These tests characterise the different physical, electrical, and chemical properties of the wire coating material.

Chemometric analysis is then used to correlate the acquired spectra with the properties determined via the tests, to determine a correlation model.

Prior to the correlation model being created the training and validation spectra are initially pre-processed. This may involve using Principle Component Analysis and dendogram trees (cluster analysis). External parts of the spectra are cut-off (influence of light at low wavelengths and instrumental resolution issues at high wavelengths) and subsequently outliers are identified (isolated if needed) through either Kennard-Stone, median absolute deviation MAD, Outlier Isolation forest algorithms. The spectra are then smoothed through a Sovitzky-Golay filter. A baseline correction is applied: offset, de-trend, and in certain cases Multiple scattering correction (MSC). Standard normal variate (SNV) is used for scale correction of data. For model transfer and algorithm robustness a discrete wavelet transform is applied, so as to account for time effects and differences in calibration of spectrometers-spectra wavelengths shifts. Any combination of this pre-processing can be used as appropriate.

Once pre-processed chemometric analysis is performed on the spectra to create the correlation model. The chemometric methods will be outlined in more detail below.

Initially each NIR spectra acquired has a large number of data points, covering a large number of wavelengths with an associated absorption value at each of these wavelengths. As is commonly known in the field of NIR spectroscopy each of the absorption peaks indicate chemical nature, such as molecular overtones and combination vibrations for different functional groups. There is typically an inherent correlation between some of these peaks.

When creating the correlation model chemometric analysis tools are used to determine latent variables, which describe the NIR spectra in a reduced dimensionality (i.e. a smaller number of data points). These latent (or hidden) variables can assume the form of sums and differences, and/or products and divisions, or more complicated correlations between the starting wavelengths. The latent variables are a way of identifying which of the wavelengths are dependent on others, or which are just offset by a certain quantity with respect to others, i.e. it allows the direction of maximum variability in the starting variables (i.e. the wavelengths) to be determined. For instance, when starting from a spectrum with 500 data points, this can be reduced to just 10 data points.

Determining the latent variables may be achieved in various ways using various chemometric tools.

In one embodiment, partial least squares regression (PLS) method, as is known in the art, may be used. The PLS method associates the latent variables to the physical property of the wire coating material. PLS methods only work when the problem is a linear problem. For instance, if the speed that the wire is coated at (i.e. its polymerisation) is proportional to the latent variables. If the model is linear then the correlation model can be successfully created using PLS. It is then validated using the validation data to test the model.

However, as there are many configuration parameters used in creating the correlation model, the parameters used to create the model need to be optimised to determine the preferred parameters used to create the model. For instance, the optimum pre-processing applied.

Due to the number of parameters involved this cannot simply be done manually and instead is automated. One such method of automating this process is using genetic algorithms, as is commonly known in the art. Other machine learning, or dictionary learning, such as hyperparameter optimisation algorithms, as known in the art may be used. From the genetic algorithm the model is tested to ensure that falls within a desired threshold. For instance, having a model that is overfitted may influence the results and not provide a reliable value, and too underfitted a model may not reliably predict the values of the system. The genetic algorithm may give feedback of all combinations of parameters in terms of sum of square error (SSE), or root mean square error (RMSE) to give a standard deviation of the residuals, which may be used to determine the optimum processes. Other parameters may include any combination of $R^2$ value, mean squared error (MSE) which is used as a feedback in the termination condition of the algorithm, cross-validation, or bootstrapping.

Parameters used to create the model that may be varied using the genetic algorithms, may include the pre-processing applied. This may include the regions of the spectra (i.e. certain wavelengths) that are selected, or the certain raw data sets (i.e. NIR spectra of wires with a particular polymerisation) that are selected.

If it is determined that the correlation is not linear, and the physical parameters are not directly proportional to the latent variables, then using the PLS method described above is not appropriate. In this case neural network method, sometimes known as artificial neural network, as is known in the art, may be used instead to create the correlation model. This (like the PLS) uses back propagation. As is known in the art, this uses nodes, with associated biases and weights, which will not be discussed in detail here. Alternatively, in other embodiments a non-linear kernel algorithm may be used rather than neural network method. PVA/PVF polymers are one type of polymer that exhibit this non-linear behaviour.

In the same way as described above, when using the neural network for non-linear problems, a genetic algorithm method may be used to determine the optimum parameters for creating the correlation model.

The determination of whether the method is linear or non-linear, and the selection of the appropriate chemometric method, (i.e. PLS or neural network) can be determined based on the results of the genetic algorithm (or machine learning) method. This is an automated process. However, in other embodiments the user may have control over this determination.

The type of processing used and the specific combinations of processing used vary depending on the type of the wire coating material. Typical wire coating enamels include Polyethylenimine (PEI), PEI+AI, Polyvinyl fluoride (PVF), Polyurethane (PU), fibre glass, or epoxy. Different enamel (wire coating material) types contain different additives and solvents. Therefore, NIR functional groups are found to vibrate (known as specific overtones) in the NIR region at different wavelengths. The direction of maximum variability and the multivariate analysis has to be performed on each enamel, in order to gather the new latent variables to create a correlation model specific for that enamel.

As discussed, it is preferred that the parameters that are used to determine the quality of the coating is the polymerisation of the wire coating. During the curing of the wire coating material the polymers change their chemical structure, performing the cross-linking; and as the solvents evaporate new chemical formal groups are formed. When using NIR, the signal from the probe excites the molecules in the wire coating. This can enable the first and second overtones of vibration of the formal groups and the combination of these formal groups (overlapping effects) to be visible in the NIR-band. Throughout the curing process the vibrational information in the NIR-region changes coherently. The NIR spectroscopy system can detect these changes which are used to create the correlation models.

Once a correlation model has been established it can be successfully used to test the quality of wire coating without the need for any physical tests to be carried out. All that is required is the spectra of the wire coating to be tested and through projection onto the correlation model, the unknown properties of the wire coating can be determined.

The deviation of a new spectrum from the population of spectra used for the model creation is therefore back-processed by the correlation model in terms of analysis of the same latent variables. This may result in an interpolation in least squared sense.

To determine the unknown properties of a coating material using the correlation model, firstly spectra are acquired of the wire coating material to be tested. The same data processing and analysis that was used to establish the correlation model is then applied to the acquired spectra. The spectra can then be projected onto the correlation model to determine any deviation from the model. The output from the correlation model provides details on the property of the system, e.g. the polymerisation level. This provides an insight into the quality of the coating material, thus allowing the operating parameters of the coating system to be adjusted accordingly to adjust the polymerisation.

One example of where this type of automatic feedback coating system may be implemented may be in controlling the oven temperature of the coating system. Overnight the outside air temperature changes, meaning that the intake of air into the coating oven can vary, particularly in old ovens where no temperature control is undertaken, leading to changes in the oven temperature. The polymerisation of the coating material is dependent on the temperature of the oven, with the change in oven temperature leading to changes in the polymerisation levels. Having a NIR monitoring system, as described above, can lead to the polymerisation being monitored inline, allowing automatic and real time adjustment of the coating parameters. For instance, parameters such as the oven temperature, or the speed that the wire is fed through the coating apparatus 6 can be adjusted, to ensure that the wire coating meets the desired standards.

An example NIR spectra of three wire coating materials with different polymerisation levels acquired by system 2 is shown in FIG. 9. In the example shown the wire is coated with PEI+AI enamel.

The spectra have been processed as outlined above. As can be seen the range 1100-1200 nm 301 represents the second overtone $CH_2$ and $CH_3$ stretching. The 1400-1550 nm range 303 represents NH and OH first over tone stretching and combination modes of CH groups and methylene and methyl. The 1630-1700 nm range 305 represents first overtone CH stretching (typical of methylene $CH_2$ groups). As can be seen each of these regions show a characteristic absorption representative of these functional groups.

Spectra 307 is from a wire with a coating that has the ideal level of polymerisation. Spectra 309 is from a wire with a coating that is under polymerised, and spectra 311 is from a wire with a coating that is over polymerised. As can clearly be seen, in each of the regions of interest the absorption peaks for each of the spectra with different polymerisations levels show a different intensity owing to the different level of polymerisation. These differences can be used to build the correlation model. Thus, the model is created through the multivariate analysis obtained from latent variables that are correlated to the physical properties as outlined above.

Once the spectra of the wire currently under test has been projected onto the correlation model, and the quality of the coating parameter determined, this can be used to control the coating process in real time. This may involve presenting the details of the polymerisation of the coating determined from the correlation model to an operator via user interface 14. The operator may then be able to adjust the coating process in real time. Advantageously, this provides real-time control, with the indication displayed to the user near instantaneously after the spectra of the coating has been acquired.

Alternatively, there may be an automatic feedback loop, with the coating process automatically adjusted. The feedback loop enables parameters of the wire coating process to be adjusted, automatically controlling the wire coating process based on the measured properties of the polymer coating from projection onto the correlation model. Advantageously, this provides a fully automated system, not requiring any user input to adjust the coating process, based on the quality of the measured wire.

In other embodiments, the automatically generated data may be automatically displayed on the visual display, and the wire coating process may be automatically adjusted using the feedback loop. This may enable user intervention to override the feedback loop if required, whilst maintaining an automatic procedure when there is no user override.

Alternatively, the automatically generated data may be automatically displayed on the visual display, and in certain instances may require a user to confirm that the feedback loop should automatically adjust the wire coating process. This gives the user a decision to override any change to the coating process, which may be important for instances when the coating process is to be changed drastically.

Although the embodiments have so far been described in relation to in-line testing, where the properties of the polymer coating are used to provide feedback to automatically adjust the coating process in real time, embodiments also include the method and apparatus being used to determine the properties of a coating material in an offline system, i.e. not during the coating process. Advantageously, coatings of any type of polymer coated object can be tested at any time, for instance to provide details of the quality of the coating.

Figure 10A:
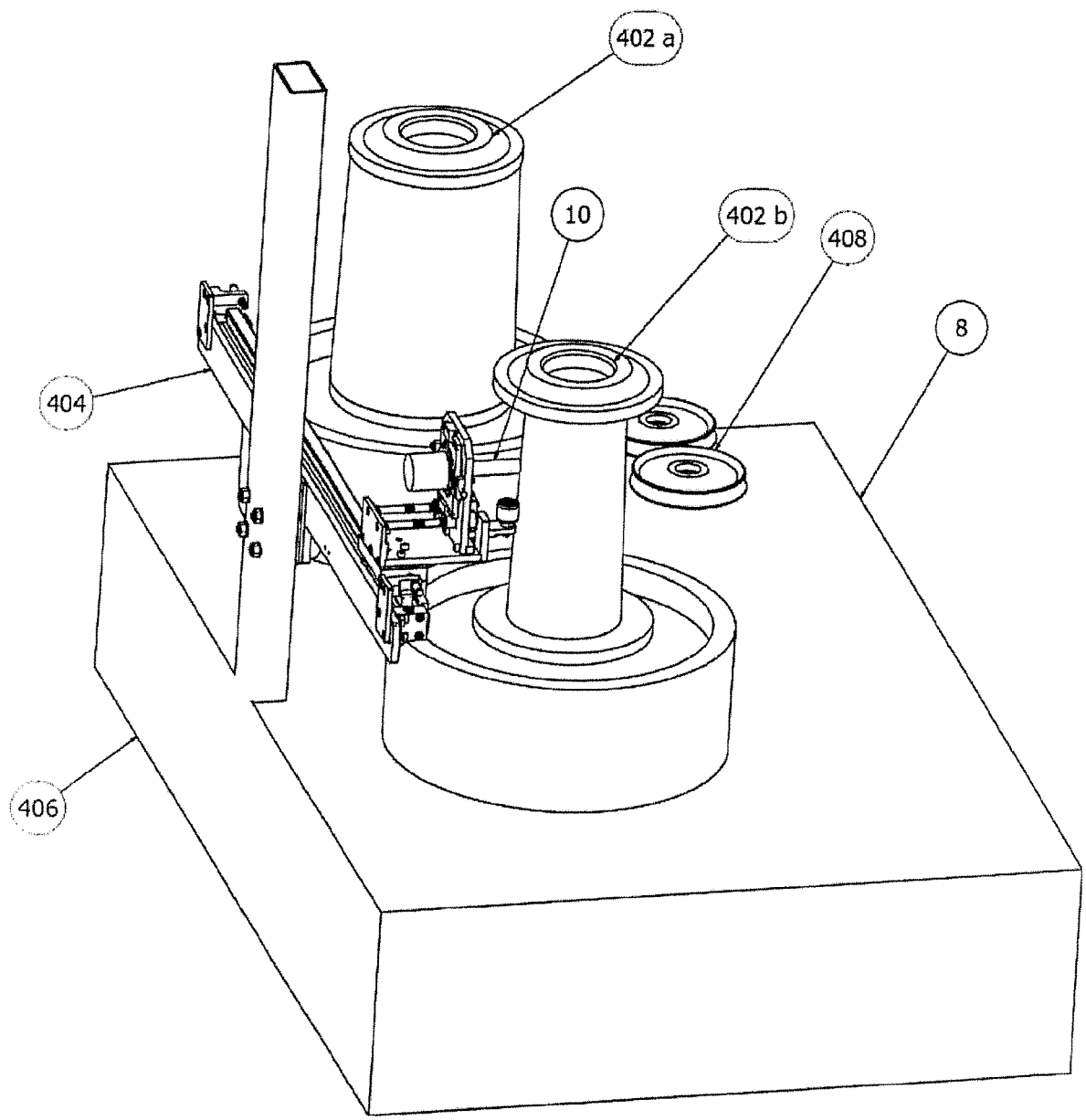
FIG. 10A shows a side on top down perspective view of a third embodiment of the wire testing apparatus.
Figure 10B:
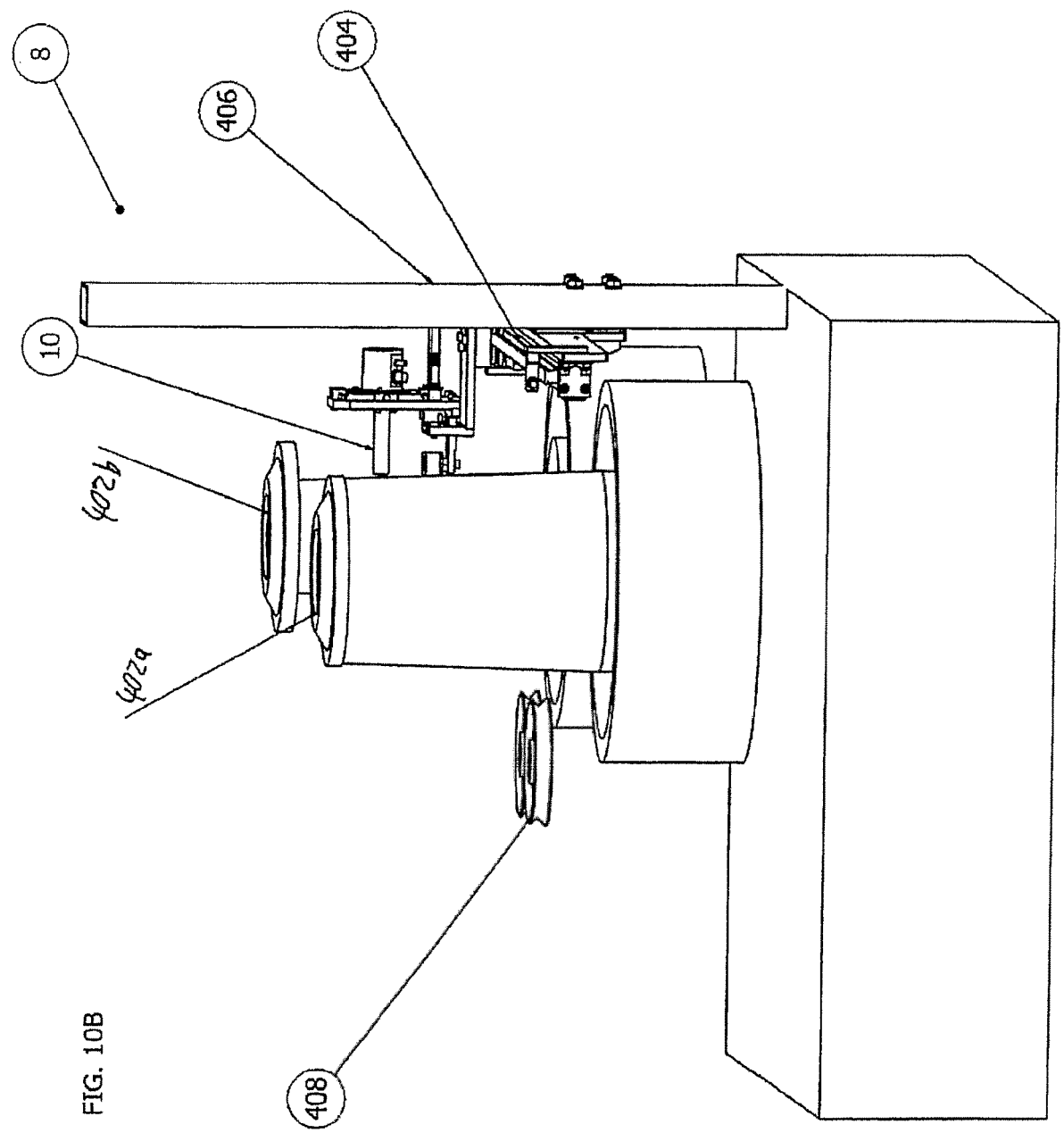
FIG. 10B shows a side on perspective view of a third embodiment of the wire testing apparatus.

FIGS. 10A and 10B shows an wire testing apparatus 8 according to a further embodiment. The apparatus shows a first reel (i.e. spool) 402a and a second reel 402b. Probe 10 is located on a rail 404 via housing 406. A set of pulleys 408 are located between the first and second reels 402.

The probe 10 acquires spectra of the coating material while the wire 4 is on the reel 402. Wire is wound via an automated system onto the reels 402a 402b, and when one reel is full the winding is switched automatically to the other reel. This allows the operator to change the full reel with an empty one, allowing the coating testing process to go on without interruption.

The probe 10 and its housing 406 is movable along the rail 404 on a pneumatic system. This enables the probe 10 to be switched between acquiring spectra of wire 4 on either reel 402. Preferably, the testing apparatus 8 shown in FIGS. 10A and 10B is for use on wires 4 that are below 1.5 mm in diameter.

In other embodiments the probe 10 and its housing 406 is movable along the rail 404 using any of a mechanical, electromechanical or electropneumatic system. The switching may be either automatic or manual.

This provides effectively 'real time' feedback for the industrial wire coating process by projecting the acquired spectra onto a correlation model in the same way as discussed above.

For instance, an example production situation may involve having a wire coating line speed of 66 cm/s, with the detection area of the NIR probe being about 1 cm in size (in diameter), the dimension of the wire is 500 µm, and the circumference of the reel of 50 cm. This means that in the 1 cm detection area there are approximately 20 wire turns. It means that in 1 cm area of detection on the reel we obtain information of approximately the past 15 seconds of coating production. This enables effectively real time feedback allowing the coating parameters to be changed as necessary.

Figure 11:
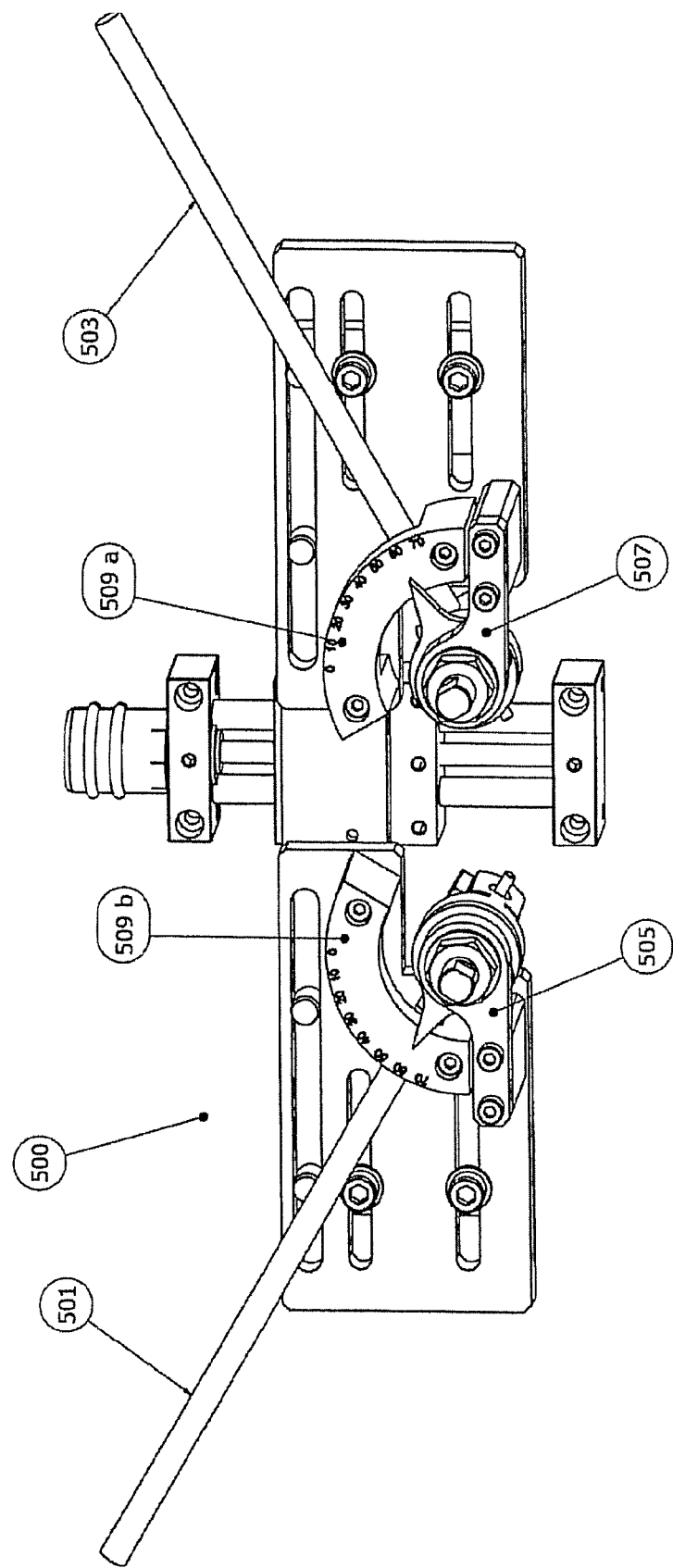
FIG. 11 shows an alternative tool that is used for detecting wire coating parameters when the wire coating material applied to the wire is thin.

FIG. 11 shows an alternative tool that is used for detecting wire coating parameters when the wire coating material applied to the wire is thin. This apparatus is required for wires of this type, as the wire testing apparatus in FIGS. 2A to 6 cannot be used as the incident light is not scattered into the wire coating material enough, such that the reflected light is not sufficient for determining different polymerisation levels. In FIG. 11 the wire testing apparatus 500 comprises a transmission fibre 501 and a detection fibre 503. The transmission fibre 501 is located on a movable axel 505 as is commonly known in the art, which allows the movement of the transmission fibre 501 over a range of angles relative to the coated wire. Likewise the detection fibre 503 is also located on movable axel 507. Indicators 509a and 509b display the angles at which the fibres 501 503 are orientated with respect to a plane perpendicular to the direction the wire is moving. Advantageously, being able to incline the transmission fibre 501 and the detection fibre 503 allows the light path to be controlled, enabling light to be detected at a set distance.

Upon detecting the NIR spectra using apparatus 500 the same analysis as described above including processing, and chemometric analysis, can be used to determine the coating parameter of the wire coating material in real time.

Advantageously, the embodiments described enable control of a wire coating process in real time. Immediately after the wire is coated, spectroscopy can be used to determine the quality of the coating. This enables 'in-line' testing of the wire coating. This allows adjustments to be made to the coating parameters almost instantaneously during the coating process. It is therefore not necessary to carry out bench (offline) tests, as conventionally known in the art, in order to determine the quality of the wire coating material. Instead the correlation model as described allows the properties of the wire coating material to be inferred.

Figure 12:
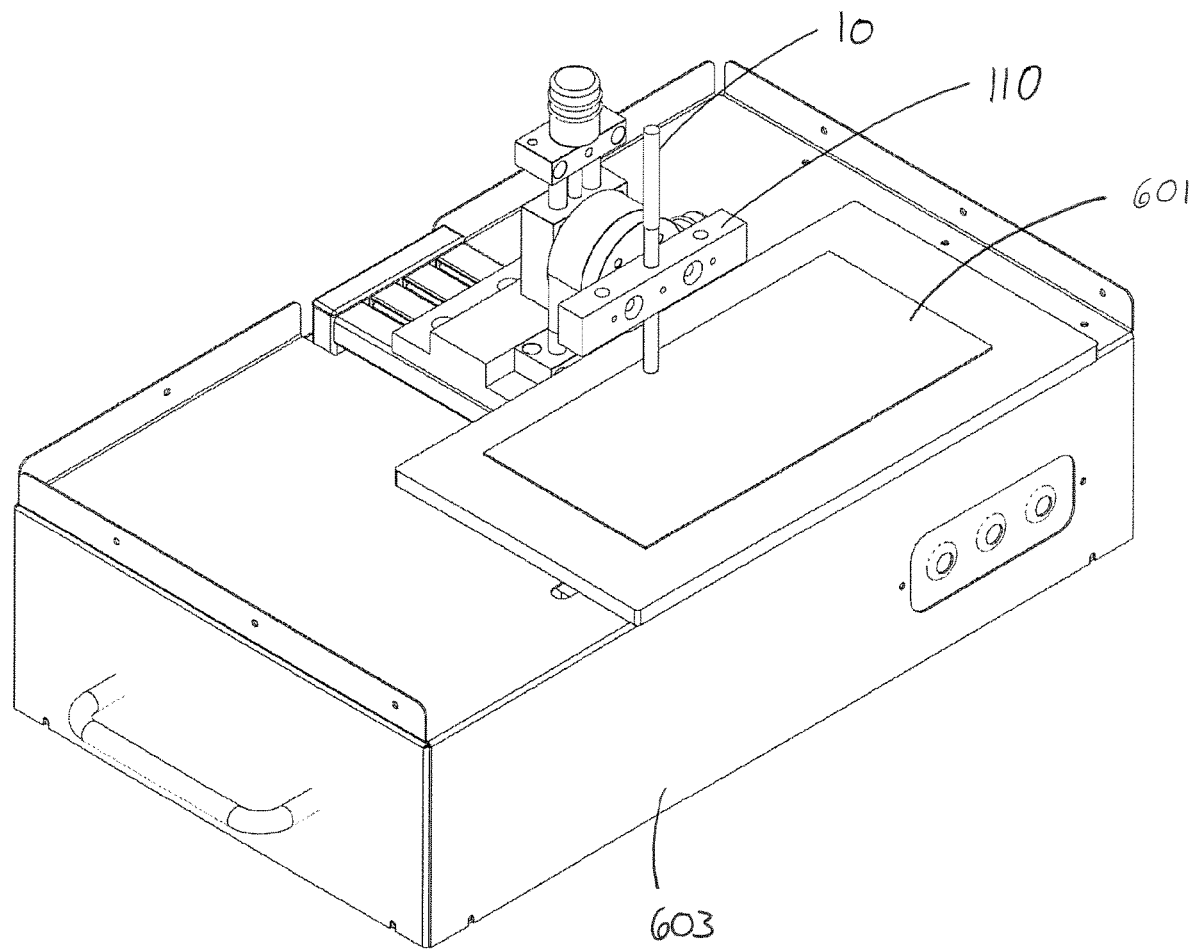
FIG. 12 shows a further embodiment of an object coating testing apparatus that is used to test the polymer coating of an object.

FIG. 12 shows an alternative apparatus that can perform the method of embodiments of the present invention, demonstrating that the method is not limited to testing coatings applied to wires. As shown in FIG. 12 the apparatus is testing the quality of polymerisation of a polymer coating of a planar surface, such as a sheet. As can be seen the apparatus comprises a probe 10 and probe holder 110 for holding the probe adjacent to but not in physical contact with the object 601 that is being tested. The object 601 is placed on bench 603, along with the probe 10 and probe holder 610. The object 601 can be manually moved by the operator to test the quality of the coating material along the object 601. However, it would be understood that an automated system may be used to move the object relative to the probe 10. The distance between the probe 10 and the surface may also be automatically adjusted. This is particularly advantageous when the surface being coated is curved and it is desirable to maintain a substantially constant spacing between the probe and the surface.

FIG. 12 can be operated in-line with the coating system, i.e. the quality of the coating material is determined and the coating parameters automatically adjusted, as described above. Many modifications and variations may be made to the above-described embodiments within the scope of the invention.

Alternatively, the apparatus and methods described above, may be used as on offline apparatus, where the properties of the coating material is determined at a later point in time, not in conjunction with the coating process. For instance, the apparatus may be used to determine the polymerisation of a coating on an object, when the object is in use. This may provide an insight into the quality of the coating on the object. For instance, this could be used for quality testing. The properties measured can give useful information regarding the potential lifetime of the object being tested and therefore prevent damages and failures. Advantageously, as this is a non-destructive test the object under inspection can be tested in situ, without requiring it to be disassembled.

In other embodiments the apparatus may be handheld. The apparatus may comprise a handle, such that the probe can be held by a user next to the object that is to be tested. The user can place the probe at any position next to the object in order to determine the properties of the polymer coating as discussed above. This would be advantageous to test the quality of coatings on objects when they are in use.

Although the methods described throughout, and the apparatus described in relation to FIGS. 1 to 11, have been described in relation to a "wire coating process" and "wires" the methods and apparatus should not be limited as such. The apparatus and methods may be used on any object with a polymer coating. For instance, this may be any polymer coated surfaces. Objects that may have polymer coated surfaces that may be tested may comprise, and are not limited to, electric motors, coils, large metal sheets, electronic control coils (ECC), generators, transformers, washing machines or other household appliances, window and door frames, optical fibre cladding (single and ribbon configuration), coaxial fibre cladding.

Where only a single coating is required, the object that is fed into the coating system is uncoated. Alternatively, in other embodiments where multiple coatings are required, the object fed through the coating system may be either uncoated, or coated.

Generally, as mentioned above conventional NIR probes can be used. However, certain applications might require a specific probe configuration. In the case of thin enamel layers, a conventional probe cannot be used since light collimators with external light sources are needed to gather the incident light and reflected light at specific angles. In this case, the light is collected by a low $OH^-$ content fibre, suitable for NIR applications and compatible with the spectrometer used (e.g. numerical aperture NA: 0.22, core size 400 um, transmitted over a 1 mm core size fibre).

The signal pre-processing may include any combination of noise-minimising methods, including any combination of: smoothing, scaling, data selection, digital filter Savitsky-Golay, and numerical differentiation (using the first and second derivatives).

In an embodiment the chemometric analysis involves using neural network architecture with a self-learning function. In other embodiments the chemometric analysis may comprise any variation of chemometric methods including; principle component analysis (PCA), genetic algorithms, dictionary learning, alternating least squares method (ALS) and the method of partial least squares (PLS).

It is preferred that the NIR spectra are acquired in the 700 nm to 2500 nm band. More preferably the NIR spectra are acquired in the 900 to 1750 nm band. However, in other embodiments any NIR band may be used.

In other embodiments different types of spectroscopy to NIR may be used. For instance any of infrared spectroscopy, Raman spectroscopy, Fourier transform spectroscopy (FTIR), mid infrared spectroscopy (MIR), Ultraviolet-visible (UV/VIS) spectroscopy, or nuclear magnetic resonance (NMR) spectroscopy may be used.

Although it is discussed above that the absorption at each wavelength is measured, in other embodiments any property may be measured. This can include any of absorbance, reflectance, and transmittance. In some embodiments from measuring reflectance, the absorbance can be determined. For instance, $A=\log(1/R)$ where A is absorbance and R reflectance. In other embodiments transmittance can be measured and reflectance determined. For instance $T=(1-R)^2-a\,t$, where a is the absorption coefficient of the material and t is the thickness of the material. In other embodiments, absorbance can be measured to determine the reflectance, and transmittance can be measured to determine reflectance.

In some embodiments, the polymer coating may be applied to the object in a viscous form. The viscosity of the coating material may be low in some embodiments. After application, the coating material may set, resulting in the polymerisation, or cross linking, of the coating structure. The polymerisation in some embodiments may occur automatically after coating. In other embodiments, the polymerisation may be achieved by passing the object through an oven, or any other type of heat source.

When acquiring the testing and validation data the spectra may be acquired using a range of different spectrometers to account for changes between spectrometers. Alternatively, the spectra may be acquired from the same spectrometer.

Although it is described to used genetic algorithms or dictionary learning to obtain the optimum pre-processing parameters, this may not be necessary. In some embodiments it can be envisaged that this step is optional.

Properties other than, or in addition to, the polymerisation may be determined. These may include the uniformity of the coating material, and/or the thickness of coating material. Alternatively, it may be determined if the type of coating material is correct, or that no foreign objects have ended up within the coating material.

In some embodiments, the polymer coating may be a thermosetting polymer. In other embodiments the polymer coating may be a thermoplastic polymer. For instance, the polymer coating may be any of Polyester-imide (PEI), Polyesterimide overcoated with Amide-IMIDE (PEI+AI), Polyvinyl fluoride (PVF), Polyurethane (PU), fiber glass, epoxy, Polyester Polyethersulfone (PES), THEIC PES, Polyamide-imides (PAI), PVF/PVA (polyvinyl formal/Poly (vinyl alcohol)), PEI+PAI, PE (Polyethylene)+PAI, or other combinations with additives. The coatings may also comprise any of: epoxy, dobeckan resins, coating varnishes (for instance on decorative coatings on washing machines or other household appliances), polyester, epoxy polyesters, acrylates, polyester imide, Ethylene tetrafluoroethylene, electron-beamed crosslinking polymers, fiberglass, acrylic, PVAC, silanes, vynil acrylic, and composite materials like Fibre-reinforces polymers. Advantageously, the coating material can be chosen according to the purpose of the object.

It is preferable that the wire is magnet wire. For instance it may be for use in transformers, inductors, motors, speakers, hard disk head actuators, electromagnets, or other applications that require insulated wire. However, in other embodiments the wire may be copper, steel, aluminium, or an alloy.

Although there is shown two different wire testing apparatus 8 above, one comprising a first and second set of pulleys, and the other embodiment comprising a first, second, third and fourth set of pulleys, embodiments may comprise any combination or number of sets of pulleys. For instance, in some embodiments, there may be a set of pulleys located at the first end of the channel, and no pulleys located at the second end of the channel. In other embodiments, there may be a set of pulleys located at the second end of the channel, and no pulleys located at the first end of the channel. In other embodiments, there may a fifth and sixth set of pulleys.

Although each of the wire testing apparatus 8 were described as being for either flat or round wires it can be envisaged that they are not limed as such. Any wire with any cross-sectional profile may be used within either apparatus.

Furthermore, although it is preferable that the second pulley of each of the first, second, third and fourth sets of pulleys is arranged on a biasing member, in some embodiments this might not be so. For instance, in some embodiments the second pulley of the third and/or fourth set of pulleys may not be not movable relative to the first pulley. Where the set of pulleys only comprise a single pulley, this preferably will not be arranged on a biasing member.

Although, in the above embodiments the biasing member for moving the pulleys is a spring, any other mechanism for moving the pulleys could be used. For instance, one of the pulleys could be on a lever which is manually or automatically moved in order to move the pulleys relative to one another.

Although it shows in the embodiments discussed above, that the first set of pulleys are arranged co-axial to the second set of pulleys, and the third set of pulleys are arranged co-axial to the fourth set of pulleys, whilst the third and fourth set of pulleys are not co-axial to the first and second set of pulleys, embodiments may have any combination of orientations. For instance, the first, second, third and fourth set of pulleys may all be co-axial to one another.

Although, a probe holder and platform are shown as being separate in the above figures, they may be one unitary item in other embodiments. In other embodiments, the adjustment mechanism may be different to a screw. The attachment pegs and holes may be replaced with another movable attachment mechanism, such as a rail that the probe holder is movable on.

Any number of holes may be present in the probe holder for receiving the probe. In some embodiments, only one hole may be present, at a set angle. In other embodiments, more than three holes may be present. The more than three holes may all be at different orientations to one another.

It is not essential that the wire coating testing apparatus has a housing that can be opened, and the first and second regions of the housing may be one unitary piece. In other embodiments the housing may comprise any number of regions that are movable relative to one another, by any mechanism, not limited to hinges.

In an alternative embodiment, the probe holder and the other components may be attached to the housing by any other way, such as being welded to the housing.

Although the embodiments show a conventional NIR probe, in other embodiments, the probe may be customised for its purpose.

In other embodiments, more than one probe may be used. For instance, two probes may be used to acquire spectra at different sections along the object. In other embodiments, a number of probes may be located at different orientations relative to the object, such that in a single pass of the object multiple spectra are acquired. For instance, the probe may be arranged above and below the object, this gives details of the coating parameters around the circumference of the object.

Rather than being held by the probe holder, as shown in the above Figures, the probe may be held by another mechanism. For instance, a clamp mechanism. The probe may be attached to the clamp and held above the object to be tested. The clamp may be on a post to enable the probe to be moved up and down relative to the object. The clamp may be rotatable to enable the probe to be held at different orientations relative to the channel/object.

The coating system as described above comprises an operator interface; in other embodiments the coating system may not comprise an operator interface when no operator interaction is required.

Other embodiments of the invention will be apparent to those skilled in the art from consideration of the specification and practice of the embodiments disclosed herein. It is intended that the specification and examples be considered as exemplary only, with a true scope and spirit of the invention being indicated by the following claims. In addition, where this application has listed the steps of a method or procedure in a specific order, it may be possible, or even expedient in certain circumstances, to change the order in which some steps are performed, and it is intended that the particular steps of the method or procedure claims set forth here below not be construed as being order-specific unless such order specificity is expressly stated in the claim.

The invention claimed is:

1. A method performed in a coating testing system for automatically determining the polymerisation of coating material, the method comprising:
 positioning a near infrared spectroscopy, NIR, spectrometer probe adjacent to a wire to acquire NIR spectra, the wire comprising a polymer coating, wherein the spectrometer probe is maintained at a fixed distance from the wire, such that the spectrometer probe does not contact the wire, and a fixed orientation relative to the wire;
 acquiring NIR spectra of the polymer coating using the probe; and
 performing chemometric analysis on the acquired NIR spectra in order to measure the polymerisation of the polymer coating,
 wherein the probe is a reflection probe.

2. The method of claim 1, further comprising coating the wire with a polymer in a coating process.

3. The method of claim 2, the method further comprising feeding the wire through the coating testing system that both performs said coating process and performs said measurement of the polymerisation of the polymer coating.

4. The method of claim 2, further comprising, automatically generating data for substantially real time control of the coating process in dependence on the measured polymerisation.

5. The method of claim 4 further comprising:
 automatically displaying on a visual display the automatically generated data for control of the coating process substantially in real time.

6. The method of claim 4, further comprising:
 using the automatically generated data for control of the coating process in a feedback loop so that the coating process is automatically adjusted.

7. The method of claim 1, the method further comprising applying signal pre-processing to the acquired spectra.

8. The method of claim 1, wherein the chemometric analysis comprises projecting the acquired spectra onto a correlation model.

9. The method of claim 1, wherein the coating testing system for automatically determining the polymerisation of coating material comprises:
 a channel for receiving a coated wire comprising a first end where in use the wire is inserted into said apparatus and a second end where the wire exits the apparatus;
 a first set of pulleys located between the first end of the channel and the second end of the channel.

10. The method of claim 9, further comprising a second set of pulleys located between the first set of pulleys and the second end of the channel.

11. The method of claim 10, further comprising a biasing member to move the second set of pulleys relative to the first set of pulleys.

12. The method of claim 1, wherein an area of detection of the reflective probe does not exceed a surface of the wire.

* * * * *